United States Patent [19]

Baker et al.

[11] Patent Number: 5,680,456

[45] Date of Patent: Oct. 21, 1997

[54] METHOD OF MANUFACTURING GENERIC METERS IN A KEY MANAGEMENT SYSTEM

[75] Inventors: Walter J. Baker, Stratford; Feliks Bator, Easton; Robert A. Cordery, Danbury; Frank M. D'Ippolito, Derby; Kevin D. Hunter, Stratford; Kathryn V. Lawton, Branford; David K. Lee, Monroe; Louis J. Loglisci, Stamford; Steven J. Pauly, New Milford; Leon A. Pintsov, West Hartford; Ian A. Siveyer, Monroe, all of Conn.

[73] Assignee: Pitney Bowes Inc., Stamford, Conn.

[21] Appl. No.: 415,824

[22] Filed: Mar. 31, 1995

[51] Int. Cl.⁶ .................. H04L 9/08; H04L 9/00; G06F 17/00
[52] U.S. Cl. .................. 380/21; 380/23; 380/25; 380/49; 364/464.11; 364/464.15
[58] Field of Search .................. 380/21, 23, 24, 380/25, 30, 46, 49, 50, 51, 59; 364/464.02, 464.11–464.19, 464.2, 464.4

[56] References Cited

U.S. PATENT DOCUMENTS

| | | |
|---|---|---|
| 4,227,253 | 10/1980 | Ehrsam et al. . |
| 4,238,853 | 12/1980 | Ehrsam et al. . |
| 4,281,216 | 7/1981 | Hogg et al. . |
| 4,578,531 | 3/1986 | Everhart et al. . |
| 4,590,470 | 5/1986 | Koenig . |
| 4,731,840 | 3/1988 | Miniszewski et al. ............ 380/21 |
| 4,850,017 | 7/1989 | Matyas et al. ............ 380/21 |
| 4,888,800 | 12/1989 | Marshall et al. ............ 380/21 |
| 4,888,801 | 12/1989 | Foster et al. ............ 380/21 |
| 4,888,802 | 12/1989 | Cooney ............ 380/49 |
| 4,916,738 | 4/1990 | Chandra et al. ............ 380/25 |
| 4,956,863 | 9/1990 | Goss ............ 380/30 |
| 4,965,804 | 10/1990 | Trbovich et al. ............ 380/21 |
| 4,972,472 | 11/1990 | Brown ............ 380/21 |
| 5,016,277 | 5/1991 | Hamilton ............ 380/49 |
| 5,029,206 | 7/1991 | Marino et al. ............ 380/4 |
| 5,048,087 | 9/1991 | Trbovich et al. ............ 380/43 |
| 5,148,481 | 9/1992 | Abrahamm et al. ............ 380/46 |
| 5,173,938 | 12/1992 | Steinbrenner et al. ............ 380/21 |
| 5,200,999 | 4/1993 | Matyas et al. ............ 380/25 |
| 5,214,698 | 5/1993 | Smith ............ 380/21 |
| 5,237,611 | 8/1993 | Rasmussen et al. ............ 380/21 |
| 5,241,599 | 8/1993 | Bellovin ............ 380/21 |
| 5,245,658 | 9/1993 | Bush ............ 380/20 |
| 5,247,576 | 9/1993 | Bright ............ 380/21 |
| 5,265,164 | 11/1993 | Matyas et al. ............ 380/30 |
| 5,325,433 | 6/1994 | Torii et al. ............ 380/30 |
| 5,341,426 | 8/1994 | Barney et al. ............ 380/21 |
| 5,341,427 | 8/1994 | Hardy et al. ............ 380/21 |

Primary Examiner—Bernarr E. Gregory
Attorney, Agent, or Firm—Charles R. Malandra, Jr.; David E. Pitchenik; Melvin J. Scolnick

[57] ABSTRACT

A method of manufacturing transaction evidencing devices, such as digital postage meters, includes the steps of generating a master key in a logical security domain of a Key Management System; installing the master key into a digital postage meter; verifying the installation of the master key; and registering the master key to a logical security sub-domain in the Key Management System. The step of generating the master key further includes the steps of generating a domain; generating at least one sub-domain; installing the domain in secure boxes of the Key Management System; generating a master key and test token within the domain; and recording the master key in the domain archive. The step of installing the master key further includes the steps of installing the master key into a digital meter; and associating the master key with a unique device identifier. The step of registering the master key to a logical security sub-domain in the Key Management System further includes the steps of assigning a sub-domain to the digital meter; installing a postal identifier into the digital meter; associating the postal identifier to the unique device identifier; generating a registration token in the digital meter based on the postal identifier and the unique device identifier; generating registration tokens using the master key recorded in the archives; verifying that the registration tokens are identical; and recording the master key in the sub-domain. The steps are repeated for each domain assigned to the digital postage meter.

15 Claims, 16 Drawing Sheets

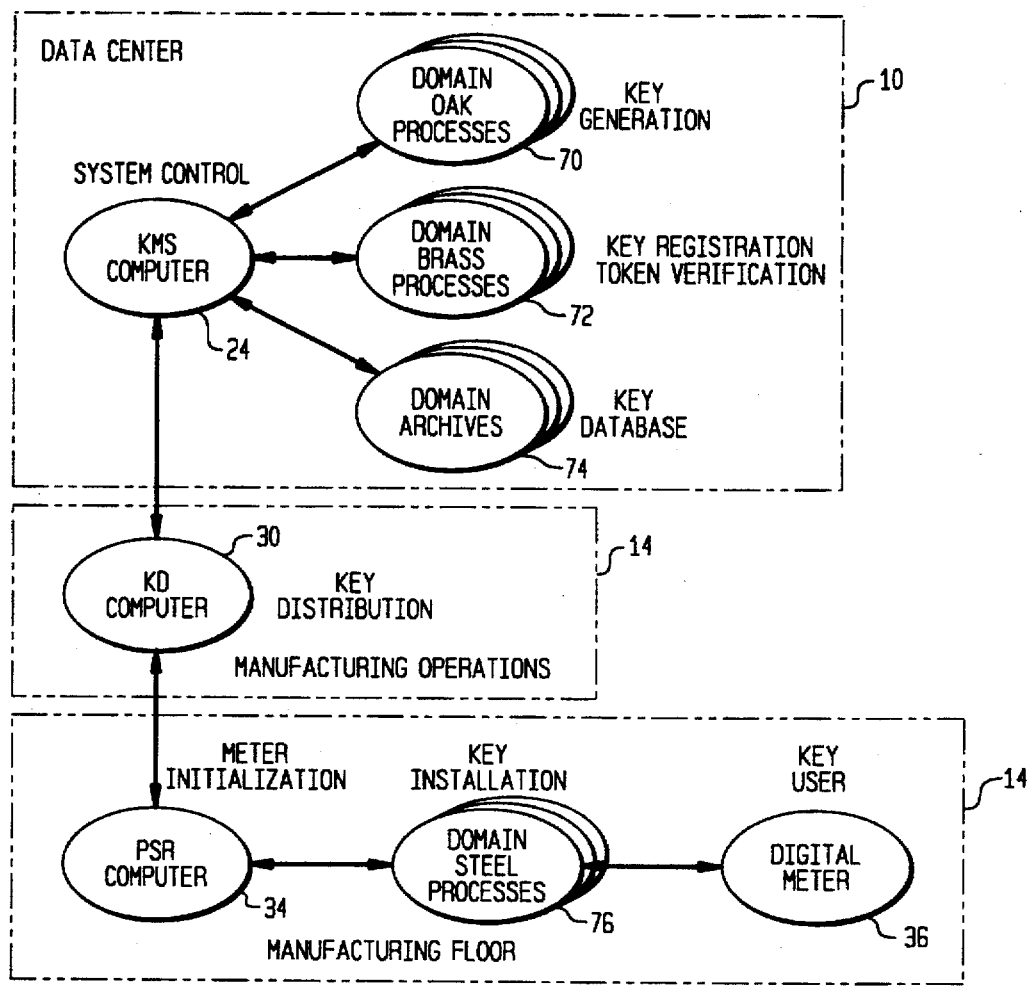
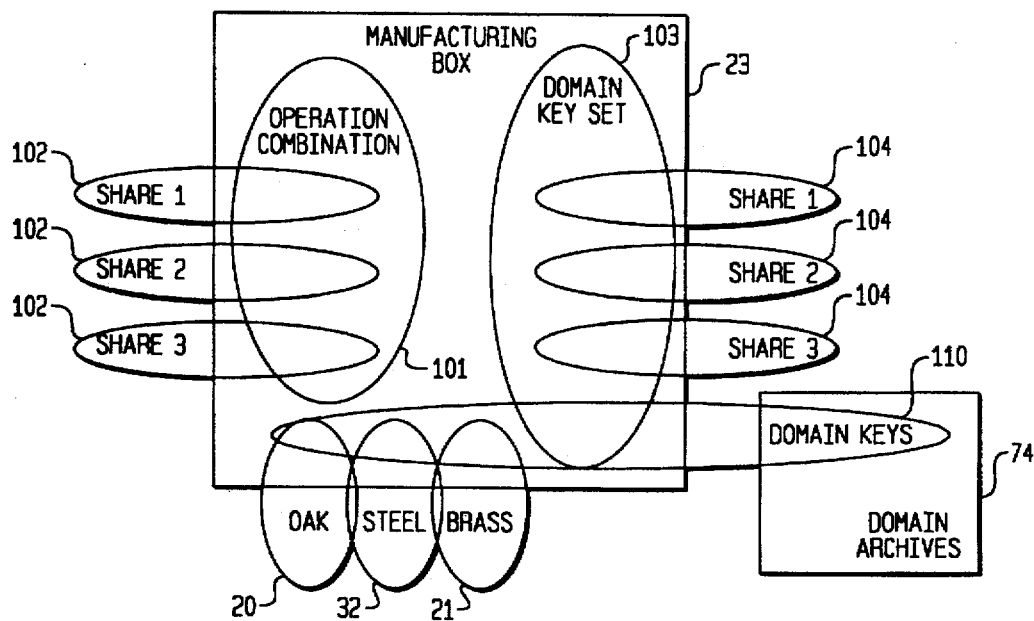

FIG. 30

| KEY INSTALLATION MESSAGES | | |
|---|---|---|
| MESSAGE | PURPOSE | CONTENTS |
| MI0 | REQUEST KEY | KDC → KMC: DOMAIN, $S_{ID}$ |
| MI0' | NEW KEY PRODUCED | ARCHIVE → KMC: $KEY_{ID}$ |
| MI1 | REQUEST KEY | KMC → O: DOMAIN, $S_{ID}$, $KEY_{ID}$ |
| MI2 | NEW KEY PRODUCED | MI3, MI4 WITH SAME KEY, $KEY_{ID}$ |
| MI3 | ARCHIVED NEW KEY FOR BRASS | O → B: [NEW, $O_{ID}$, DOMAIN, $S_{ID}$, $KEY_{ID}$, (K)$P_S$ ]$p'_O$ |
| MI4 | NEW KEY TO INSTALL | O → S: [NEW, $O_{ID}$, DOMAIN, $S_{ID}$, $KEY_{ID}$, (K)$P_S$, [TEST DATA]K ] $p'_O$ |
| MI5 | INSTALL KEY | S → METER: K |
| MI6 | INSTALLED KEY EVIDENCE | METER → S: MSN, [TEST DATA] K |
| MI7 | KEY INSTALLED | S → B: [INSTALLED, $O_{ID}$, DOMAIN, $S_{ID}$, $KEY_{ID}$, MSN, [TEST DATA] K ] $p'_S$ |
| MI8 | CONFIRM KEY INSTALLED REQUEST | KMS → B: MI3, MI7 WITH SAME $KEY_{ID}$ |
| MI9 | ARCHIVE KEY INSTALLED | B → ARCHIVE: [INSTALLED, $O_{ID}$, DOMAIN, $S_{ID}$, $KEY_{ID}$, MSN, (K)$P_B$ ] $p'_B$ |
| MI10 | CONFIRM KEY INSTALL TO MFG | B → KDC: [INSTALLED, $KEY_{ID}$, MSN] $p'_B$ |

INSTALLATION MESSAGES

NOTATION:
- (KEY)P: KEY IS ENCRYPTED USING PUBLIC KEY P
- (M)p': MESSAGE M SIGNED USING PRIVATE KEY p'
- P / p': A PUBLIC / PRIVATE KEY PAIR USED FO CONFIDENTIALITY
- p / p': A PUBLIC / PRIVATE KEY PAIR USED FOR AUTHENTICATION
- S: A SECRET KEY USED FOR CONFIDENTIALITY
- s: A SECRET KEY USED FOR AUTHENTICATION
- $S_{ID}$: IDENTIFICATION NUMBER OF THE STEEL BOX
- O: OAK
- B: BRASS
- K: A METER KEY
- $KEY_{ID}$: A NUMBER ASSIGNED UNIQUELY TO KEY K
- TEST DATA: A PREDEFINED SET OF DATA THAT IS USED TO VERIFY THAT KEYS ARE INSTALLED IN THE METER CORRECTLY

FIG. 31

KEY REGISTRATION MESSAGES

| MESSAGE | PURPOSE | CONTENTS |
|---------|---------|----------|
| MR1 | KEY REGISTRATION REPORT | METER $\rightarrow$ B$_{COUNTRY}$ : [MSN, INDICIA NUMBER, COUNTRY, DATE] KEY |
| MR2 | REGISTRATION REQUEST | KMS $\rightarrow$ B$_{COUNTRY}$ : MR1, MI9 WITH SAME MSN |
| MR3 | ARCHIVE KEY REGISTERED | B$_{COUNTRY}$ $\rightarrow$ ARCHIVE: [REGISTERED, DOMAIN, MSN, INDICIA NUMBER, COUNTRY, (KEY) S$_B$] s'$_B$ |
| MR4 | CONFIRM REGISTRATION | B$_{COUNTRY}$ $\rightarrow$ KMS$_{COUNTRY}$ : [REGISTERED, DOMAIN, MSN, INDICIA NUMBER, COUNTRY ] s'$_B$ |

METHOD OF MANUFACTURING GENERIC METERS IN A KEY MANAGEMENT SYSTEM

FIELD OF THE INVENTION

The present invention relates generally to a system for cryptographic key management and, more particularly, to a system for key management of cryptographic keys distributed to postage meters.

1. Related Applications

The present application is related to U.S. application Ser. Nos. 08/414,563, now abandoned; 08/414,896; and, 08/414,897, now abandoned, all filed Mar. 31, 1995, and assigned to the assignee of the present invention.

2. Background of the Invention

Digital printing technology has enabled mailers to implement digital, i.e. bit map addressable, printing in a convenient manner. It has been found to be desirable to use such techniques for the purpose of evidencing payment of postage. Technological advances in digital printing technology has made it possible to print postage indicia that is unique for each mailpiece. A computer driven printer can print, for example, a postal indicia in a desired location on the face of a mailpiece. The indicia is unique because it includes information relating directly to the mailpiece, for example, postage value, date, piece count and/or origin postal code.

From a Post Office's perspective, it will be appreciated that the digital printing and scanning technology make it fairly easy to counterfeit a postal value bearing indicia since any suitable computer and printer may be used to generate multiple copies of an image.

In order to validate a mailpiece, that is to ensure that accounting for the postage amount printed on a mailpiece has been properly done, it is known that one may include as part of the franking an encrypted number such that, for instance, the value of the franking may be determined from the encryption to learn whether the value as printed on the mailpiece is correct. See, for example, U.S. Pat. Nos. 4,757,537 and 4,775,246 to Edelmann et al., as well as U.S. Pat. No. 4,649,266 to Eckert. It is also known to authenticate a mailpiece by including the address as a further part of the encryption as described in U.S. Pat. No. 4,725,718 to Sansone et al. and U.S. Pat. No. 4,743,747 to Fougere et al.

U.S. Pat. No. 5,170,044 to Pastor describes a method and apparatus for the representation of binary data in the form of an indicia comprising a binary array of pixels. The actual arrays of pixels are scanned in order to identify the provider of the mailpiece and to recover other encrypted plain text information. U.S. Pat. No. 5,142,577 to Pastor describes various alternatives to the DES encoding for encrypting a message and for comparing the decrypted postal information to the plain text information on the mailpiece.

U.S. Pat. No. 5,390,251 to Pastor et al. describes a system for controlling the validity of printing of indicia on mailpieces from a potentially large number of users of postage meters including apparatus disposed in each meter for generating a code and for printing the code on each mailpiece. The code is an encrypted code representative of the apparatus printing the indicia and other information uniquely determinative of the legitimacy of postage on the mailpieces.

A digital meter provides evidence of the payment of postage by signing the postal information on the envelope with two "digital tokens." One digital token provides evidence to the postal service, and the second digital token provides evidence to the vendor, such as the assignee of the present invention. A digital token is a truncation of the result of encrypting indicia information including, for example, postage value, piece count, date of submission, and originating post office.

A new class of digital meters is being developed that employ cryptographic means to produce evidence of postage payment. The encryption is performed using a cryptographic key. In each digital meter, independent keys are used for generating the digital tokens. For security reasons, the keys in different meters are also independent. Information about the meter and mail piece are combined and encrypted with vendor and postal master keys or keys derived therefrom. Portions of the resulting information are printed on the mail piece as digital tokens. The information and tokens can be verified by a device that processes the information in the same manner and compares the resulting digital tokens with those printed on the mail piece.

A key management system is needed to distribute cryptographic keys to digital meters in a secure and reliable manner. The key management system must include means for verifying indicia and digital tokens to detect the fraudulently generated of indicia and duplicated indicia.

It is desired that the key management system have the capability to manufacture meters without assigning meters to a destination country, i.e. manufacturing generic meters that could be inventoried. However, manufacturing generic meters creates a problem that suggests either the need to install keys in the field, or the need to translate keys between domains. Either alternative presents a significant security and key integrity threat. It is desired that a key management system include means that avoids such problems.

SUMMARY OF THE INVENTION

The present invention provides a method of manufacturing transaction evidencing devices, such as digital postage meters. Some meters are manufactured without knowing the destination country. This creates a problem that suggests either the need to install keys in the field, or the need to translate keys between domains. Either alternative presents a significant security and key integrity threat. These problems have been avoided in the present invention by the creation of a separate domain called the Earth domain. It has been found that the foregoing problems relating to generic meters have been avoided in the present invention by the creation of a separate domain referred to herein as the Earth domain. The present invention provides the capability to manage digital meter keys securely when the destination country is not known at time of manufacture.

In accordance with the present invention, meter keys are created and installed in a digital meter under the postal domain for which a meter is created. When an indicia serial number for the meter is registered, i.e. becomes active, the country of the post is known. That country's verification box then verifies the registration, and a meter key is then saved, preferably indexed by an indicia serial number. Each country's verification box saves the meter keys for that country encrypted with a secret key that is specific to that country.

In accordance with the present invention, any country receiving meters that have not been initialized explicitly for that country during the manufacture process will receive Earth domain meters. The secure verification box for that country is activated as an earth domain verification process with the database encryption key for that country. If a country has meters manufactured explicitly for that country's postal domain and meters manufactured under the Earth postal domain, then the verification box for that country must be able to operate in the country's sub domain of the earth domain, with and in that country's own domain.

The present invention includes the steps of generating a master key in a logical security domain of a Key Management System; installing the master key into a digital postage meter; verifying the installation of the master key; and registering the master key to a logical security sub-domain in the Key Management System. The step of generating the master key further includes the steps of generating a domain; generating at least one sub-domain; installing the domain in secure boxes of the Key Management System; generating a master key and test token within the domain; and recording the master key in the domain archive. The step of installing the master key further includes the steps of installing the master key into a digital meter; and associating the master key with a unique device identifier. The step of registering the master key to a logical security sub-domain in the Key Management System further includes the steps of assigning a sub-domain to the digital meter; installing a postal identifier into the digital meter; associating the postal identifier to the unique device identifier; generating a registration token in the digital meter based on the postal identifier and the unique device identifier; generating registration tokens using the master key recorded in the archives; verifying that the registration tokens are identical; and recording the master key in the sub-domain. The steps are repeated for each domain assigned to the digital postage meter.

The Key Management System includes means for generating, distributing and managing cryptographic keys used by an information transaction system that employs cryptographic means to produce evidence of information integrity. The system comprises a plurality of functionally distinct secure boxes operatively coupled to each other. Each of the secure boxes performs functions for key generation, key installation, key verification or validation of tokens. Computers, operatively coupled to the secure boxes, provide system control and facilitate communication among the secure boxes. A plurality of separate logical security domains provide domain processes for key generation, key installation, key verification and validation of tokens produced by the transaction evidencing device within the domain using the key management functions. A plurality of domain archives, corresponding respectively to each of the security domains, securely and reliably record key status records and master keys for each domain. The Key Management System installs the master keys in the transaction evidencing device and validates the tokens. The secure boxes include a key generation box for generating, encrypting and signing a master key; a key installation box for receiving, verifying and decrypting the signed master key and for installing the master key into the transaction evidencing device; a key verification box for verifying the installation of the master key in the transaction evidencing device, a token verification box for verifying the tokens, and at least one manufacturing box for generating domain keys and distributing the domain keys among the secure boxes for each of the domains.

In accordance with the preferred embodiment of the present invention, a Key Management System generates and distributes cryptographic keys, such as Vendor keys, USPS keys, and other country's postal keys, to digital meters for multiple domains. A domain is a logical separation of data and functions enforced by unique domain authentication and confidentiality keys. The Key Management System prevents any translation of keys between domains, provides assurance in a domain that the keys were generated in the domain, and that they have been installed in only one meter by the system. The Key Management System securely distributes and maintains cryptographic keys for multiple domains. Further, the Key Management System is structured so that key management for all domains is identical.

The Key Management System supports the following security requirements: (i) meter keys are always confidential; (ii) ability to verify indicia information continues for the life of the system; (iii) status of meter master keys must always be accurately maintained; (iv) separation of domains must be maintained in order to generate and verify indicia; and (v) a key is installed, or attempted to be installed only once.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 7 is a flow diagram of a key management process;

FIG. 9 is a block diagram of the key material for the manufacturing box;

FIG. 30 is a table of the key installation messages of FIG. 29;

FIG. 31 is a table of key registration messages; and

DETAILED DESCRIPTION OF THE PRESENT INVENTION

In describing the present invention, reference is made to the drawings, wherein there is seen various aspects of a Key Management and Validation System, also referred to herein as the Key Management System.

SYSTEM OVERVIEW

Figure 1:
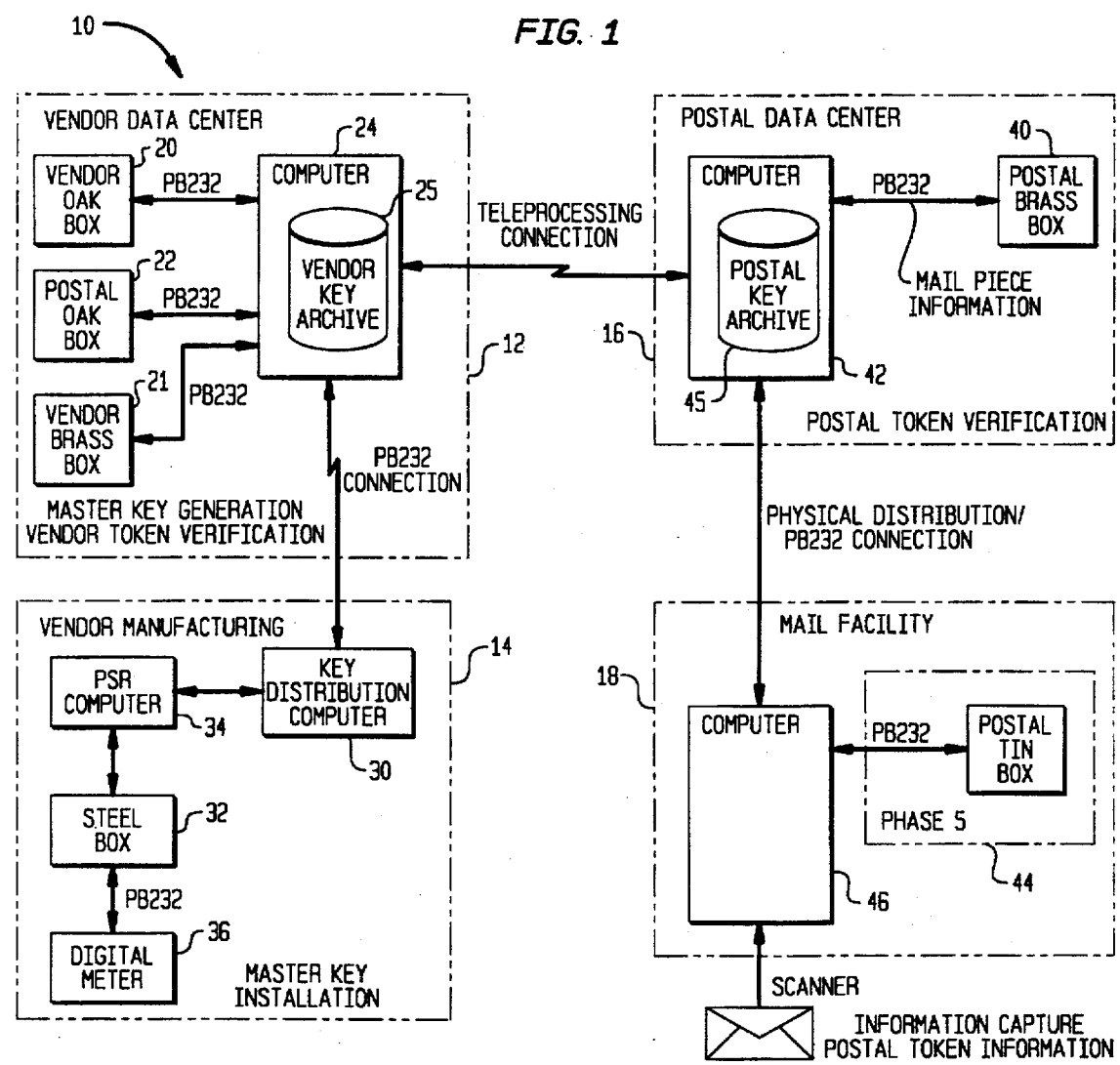
FIG. 1 is a block diagram of a cryptographic key management and validation system in accordance with the present invention.

Referring now to FIG. 1, a block diagram of a Key Management System provides an overview of the location and information flow of the Key Management System components. The Key Management System, generally designated 10, encompasses vendor facilities 12 and 14 and postal facilities 16 and 18. The vendor is the entity that manages the Key Management System. Key Management System 10 includes a plurality of functionally dedicated secure boxes, computers and communications lines. In accordance with the present invention, Key Management System 10 provides manufacturing and operational support for a new generation of digital meter products. Reference herein to digital meters and digital meter products will be of such new generation of digital meter products. It is noted that the present invention is suitable for managing the generation, distribution of cryptographic keys and the verification of cryptographic data for other applications as well.

In accordance with the present invention, vendor and postal master keys are generated, archived and installed in meters by components of Key Management System 10. Postal token keys are derived, distributed and used for remote verification by components of Key Management System 10. Vendor and postal tokens are verified by components of Key Management System 10.

Key Management System 10 supports the installation and long term maintenance of encryption keys in digital meter products. The generation of master keys is supported by Master Key Generation Boxes 20 and 22, which are also referred to herein as Oak Boxes, an attached Key Management System computer 24, also referred to herein as the KMC, and archive server 25. The distribution of master keys is supported by a Key Distribution Computer 30, also referred to herein as the KDC. The installation of master keys is supported by a Master Key Installation Box 32, which is also referred to herein as Steel Box, and an attached Parameterization, Seeding And Registration (PSR) Computer 34. Centralized verification of printed digital tokens is supported by Token Verification Boxes 21 and 40, which are also referred to herein as Brass Boxes, and attached respective Key Management System computers 24 and 42. Key Archives 25 and 45 securely and reliably record key status messages and keys.

Security Domains

Figure 2:
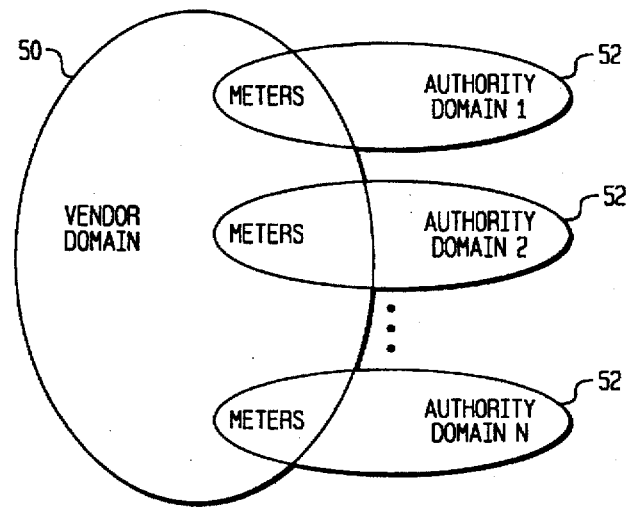
FIG. 2 is a block diagram showing the relationship of the security domains in the key management and validation system of FIG. 1.

Referring now to FIG. 2, Key Management System 10 includes separate logical security domains: one vendor domain 50 and one or more domains 52 for postal authorities. Each domain provides a full set of key generation, key distribution, key installation and token verification services. Each domain may encompass several facilities, such as vendor and postal facilities. Multiple logical security domains may exist within each secure box. Separation of such multiple domains is achieved by encryption of the domain messages in the Master Key Database. The Database encryption keys are different for each domain. Within a secure box, the separation of domains is by the limited processes enabled in the box. However, the security domains overlap in only one place, inside a digital meter. The digital meter calculates two proof of payment tokens, one using the vendor master key and the other using the postal master key. Failure in the verification of either digital token is sufficient proof of fraud.

Figure 3:
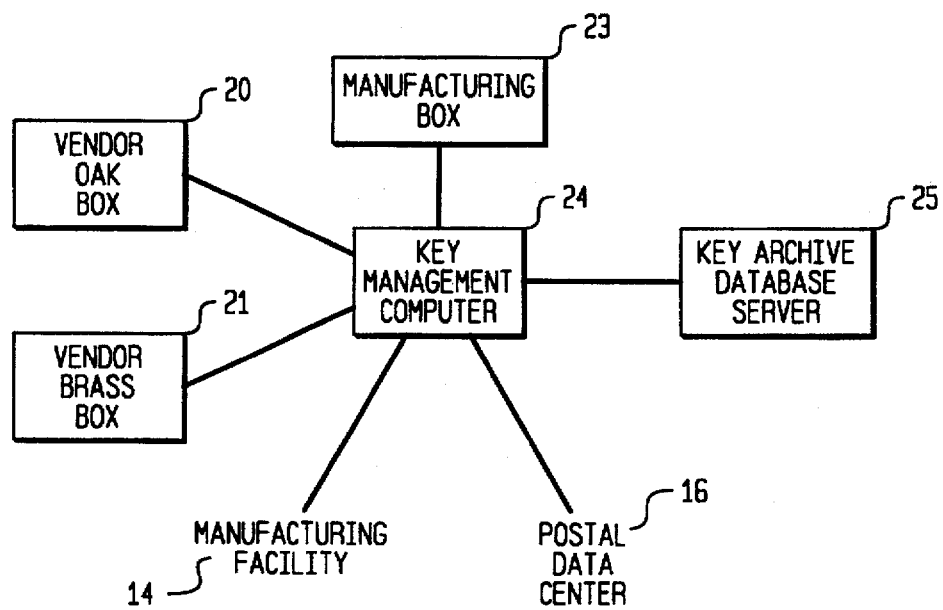
FIG. 3 is a block diagram of a vendor data center in the key management and validation system of FIG. 1.

Referring now to FIG. 3, vendor data center 12 provides physical and information access control for Key Management System components. Vendor data center 12 houses at least one Oak Box 20 that functions as a Vendor Master Key Generation Box, at least one Brass Box 21 that functions as a Vendor Token Verification Box and a Manufacturing Box 23. For security, each box has a unique ID. For added security, the generation, verification and manufacturing functions are physically separated from each other, i.e., Oak Box, Brass Box and Steel Box are separate boxes. It is noted that more than one functional box can be housed in a physical box if so desired.

Vendor KMS Computer 24 manages the secure Oak, Brass and Manufacturing boxes and the messages between them. It supports secure box communications, vendor key archive services, postal key archive services and communications with the vendor manufacturing facility 14 and Postal Data Center 16.

Figure 4:
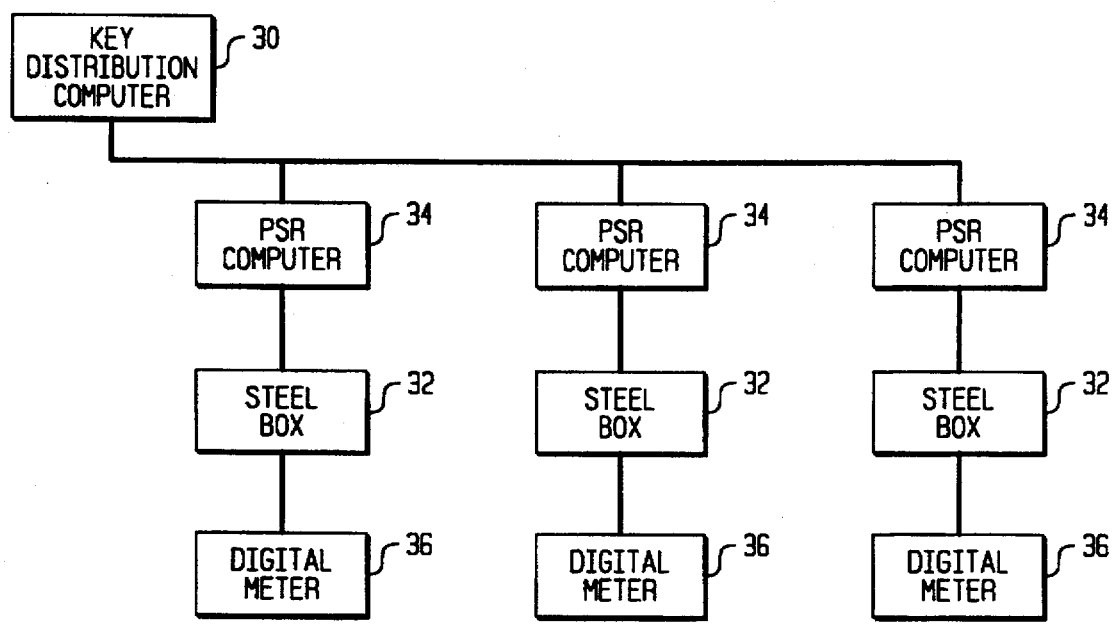
FIG. 4 is a block diagram of the vendor manufacturing facility in the key management and validation system of FIG. 1.

Referring now to FIG. 4, Vendor manufacturing facility 14 provides physical and information access control for Key Management System components. A vendor manufacturing facility 14 houses a vendor Key Distribution computer 30 and at least one secure Steel Box 32, which functions as a Master Key Installation Box, and a corresponding PSR computer 34. Vendor Key Distribution and PSR Computers 30 and 34 support communications with Key Management System computer 24, other secure boxes and on-line digital meters 36. PSR Computers 30 manage corresponding Steel Boxes 32 and the initialization of digital meters 36.

Figure 5:
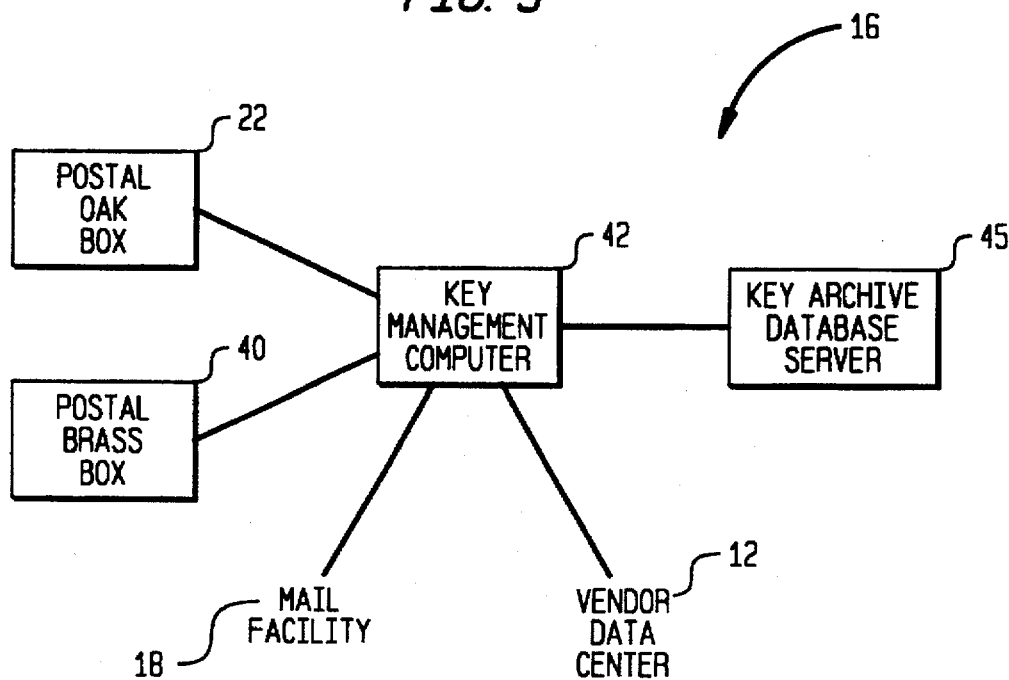
FIG. 5 is a block diagram of a postal data center in the key management and validation system of FIG. 1.

Referring now to FIG. 5, Postal Data Center 16 may provide physical and information access control for Key Management System 10 components. Postal Data Center 16 may house a Postal Oak Box 22 which functions as a postal master key generation box and a Postal Brass Box 40 which functions as a postal token verification box. A Postal Key Management System Computer 42 may support secure box communications, postal key archive services and communications with Mail Facilities 18 and Vendor Data Center 12.

Figure 6:
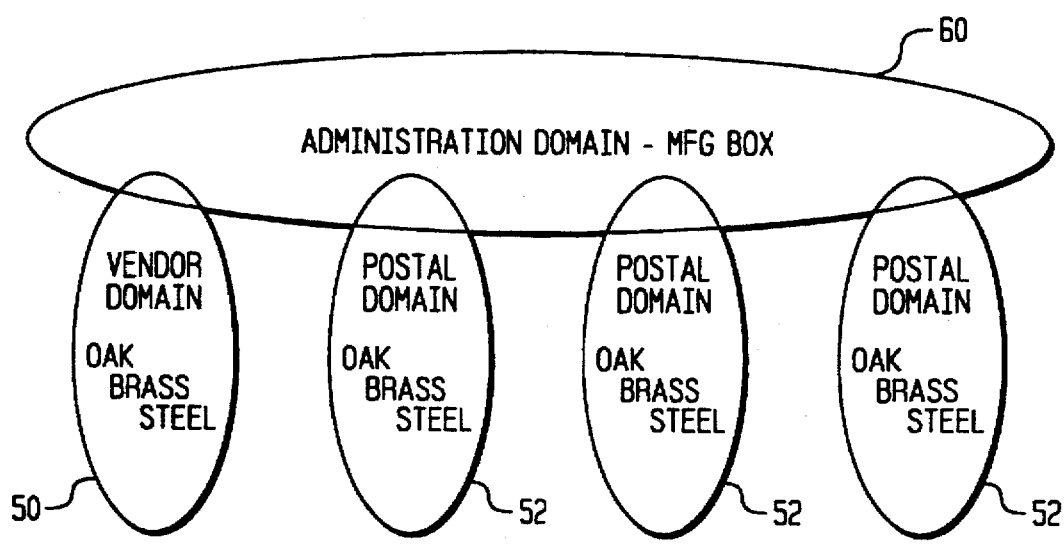
FIG. 6 is a block diagram showing the administrative domain of a manufacturing box in the key management and validation system of FIG. 1.

Referring now to FIG. 6, an additional logical security domain is required to support the installation and maintenance of all other security domains in Key Management System Components. This is called the Key Management System Administration Domain 60 which is responsible for the generation of security domains and the installation of security domains in Key Management System Components.

Installation of country specific sub-domains in an Earth Security Domain are the responsibility of the Earth Security Domain. Installation of Product Code parameters within Security Domains are the responsibility of the affected Security Domains. This will be explained in more detail below.

FUNCTIONAL CHARACTERISTICS

The following paragraphs provide an overview of all operations and messages in Key Management System 10.

Key Management System 10 provides several necessary functions to support the manufacture and operation of digital meter products. It is responsible for the generation, distribution and long term storage for all encryption keys used in digital meter products. It is also responsible for the verification of digital tokens generated by digital meter products that employ such encryption keys.

Two or more security domains are implemented by Key Management System 10. Vendor Security Domain 50 includes key generation, distribution, archival and verification services. Postal security domains 52 implement similar services. These domains overlap in one point, the digital meter that contains both vendor and postal master keys, as shown in FIG. 2, i.e., only in the meter are Vendor and Postal Master Keys available simultaneously.

KEY CHARACTERISTICS

Key Generation

Referring now to FIG. 7, a flow diagram of the Key Management Process is shown. A digital meter 36 receives the vendor master key and postal master key while physically located in the vendor manufacturing facility 14 before distribution.

The Key Management System secure box manufacturing process and the domain master key generation process provides encryption keys for Key Management System 10 and digital meters 36. Domain master keys for digital meters 36 are generated by a Domain Oak Process 70. Domain keys that are used to encrypt domain master keys as they are generated, archived and installed, are generated by Manufacturing Box 23. To provide secure and nondeterminisitic keys, two random number generator processes are employed. Each Oak Box and Manufacturing Box includes a hardware random number generator. A software pseudo-random number generator is also included. The output of these two processes are individually tested to verify that the hardware and software are operating within acceptable limits. The outputs of the two generators are combined through an exclusive-or operation. Thus, if the hardware random number generator fails, the pseudo-random number generator provides acceptable keying material until the hardware generator can be fixed.

Other KMS secure boxes have limited requirements to generate keying material. Specifically, startup confidentiality keys are generated by Brass and Steel Boxes 21 and 32 during the initialization process. Because of the limited requirements and the presence of trusted authorities during the initialization process, only software pseudo-random number generators are employed.

Master Key Identification

Key Management System 10 must enforce the security requirement that a master key can only be attempted or installed in any digital meter 36 once. For example, Key Management System 10 must ensure that a domain master key is not installed twice when two or more Steel Boxes 32 are used in the system. This requirement is satisfied through the use of domain master key identification numbers, which are composed of domain specific monotonic sequence counters. Domain Oak Processes and Domain Steel Processes track the last domain master key identification number received for a specific domain ID. When a new Generate Key or Install Key message is received, the domain oak processes or domain steel processes verify that the domain master key identification number is greater than that contained in the previous message.

When Key Management System 10 receives a Request Key command, a Steel ID is required. The Steel ID's are included in the Distribute Master Key record and must be checked by the Domain Steel Process 76. If the Steel ID in the message does not match the Steel ID for the Steel Box, the message is rejected. The Steel ID may not be modified in the message without breaking the message signature. The combination of Domain Master Key Identification Number, Steel ID and message signature satisfies a one time installation requirement.

Figure 8:
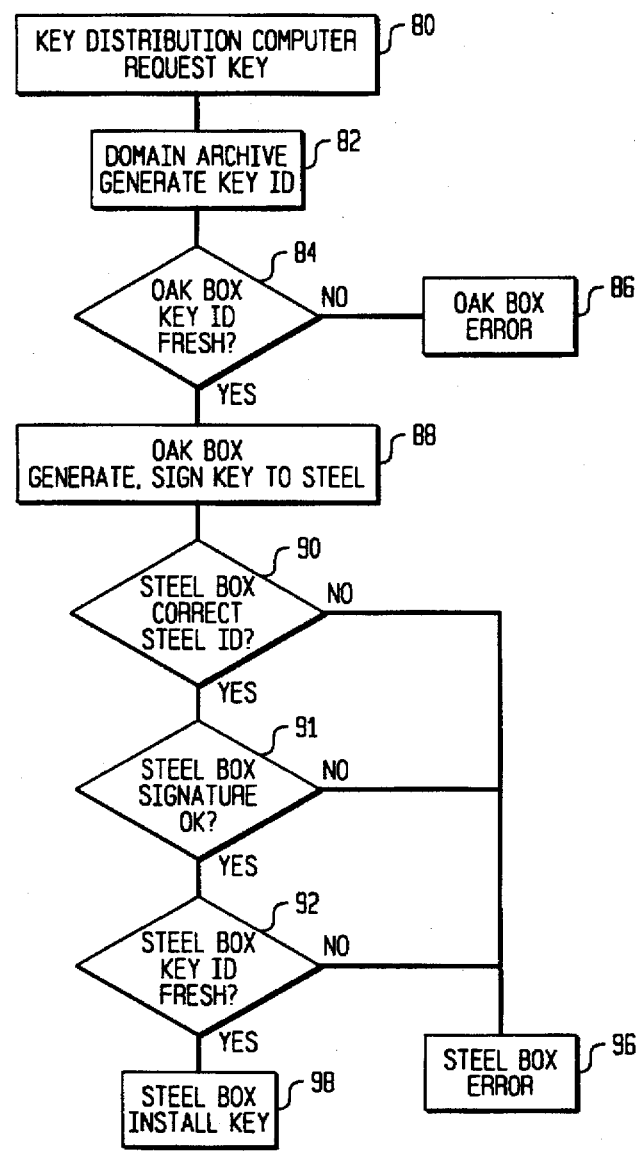
FIG. 8 is a flow chart for key identification.

Referring now to FIG. 8, Key Distribution Computer 30 requests a key at 80. At 82, Key Management System computer 24 generates a new monotomically increasing key ID from a domain archive 74. At 84, domain oak process 70 determines whether the Oak Box key ID is new against a last seen value. If it is not new, then an Oak Box error condition is initiated at 86. If the key ID is new, then at 88 Oak Box 20 generates and encrypts a key, attaches the key ID, and then signs and sends the message to Steel Box 32. At 90 domain steel process 76 determines whether the Steel ID is correct. At 92 domain steel process 76 determines if the key ID is new against a last seen value. A steel box error occurs if the message signature test fails, the steel ID is not correct or the key ID is not new. If no error occurs Steel Box 32 installs the key into a meter 36 at 98.

Manufacturing Box and Domain keys

Referring now to FIGS. 9–12, secure Boxes within Key Management System 10 must be initialized with domain configuration information and keying material. This is achieved through the use of Manufacturing Box 23 which is responsible for the creation of domains and the domain keys 110. When a domain is created, a unique domain ID is required. After a domain has been established in Manufacturing Box 23, other secure boxes may be initialized with the domain information.

All domain keys 110 are generated by Manufacturing Box 23. Domain keys 110 consist of confidentiality, authentication and operation keys that are encrypted by Domain Key Set 103. Domain keys 110 are shared among the different secure boxes. Each secure box has specific requirements for keying material.

Each Manufacturing Box 23 requires an Operation Combination 101 that is broken into three Shamir secret shares 102. Individual shares are written onto removable media and distributed to authorized personnel. Each Manufacturing Box 23 requires a Domain Key Set 103 that consists of an RSA key pair for confidentiality and an RSA key pair for authentication. The confidentiality and authentication keys are broken into three Shamir secret shares 104. Individual shares are written onto removable media and distributed to authorized personnel. RSA key pairs are described in "A Method For Obtaining Digital Signatures And Public-Key Cryptosystems," by R. L. Rivest, A. Shamir and L. Adleman in Communications of the ACM, Vol. 21, No. 2, February 1978, pp. 120–127. Shamir secret shares are described in "How To Share A Secret," by A. Shamir in Communications of the ACM, Vol. 22, No. 11, November 1979, pp. 612–613.

Figure 10:
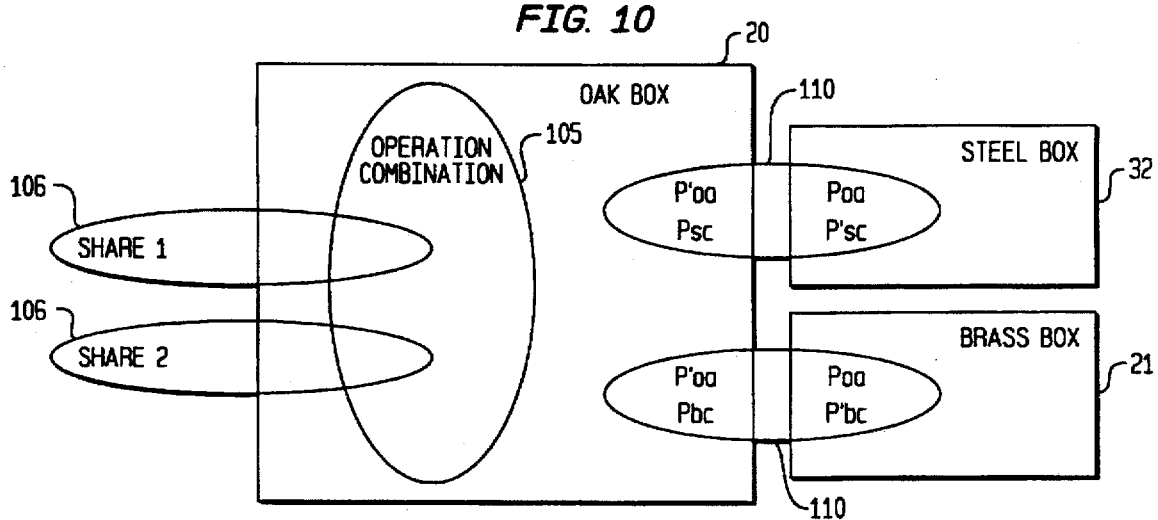
FIG. 10 is a block diagram of the key material for the oak box.

In the preferred embodiment, each Oak Box 20 requires an Operation Combination 105 that is broken into two Shamir secret shares 106 (FIG. 10). Individual shares 106 are written onto removable media and distributed to authorized personnel. All shares 106 must be entered into Oak Box 20 before it can operate. The last entered share 106 must remain in the Oak Box to keep it enabled. When the last entered share 106 is removed, Oak Box 20 is disabled.

Each Domain Oak Process 70 requires an RSA key pair for authentication. The private authentication key (P'OA) is only known by the Domain Oak Process 70 and Manufacturing Box 23. The public authentication key (POA) is known by the corresponding Domain Steel Process 76 and Domain Brass process 72. The Domain Oak Process 70 does not require a private confidentiality key.

Figure 11:
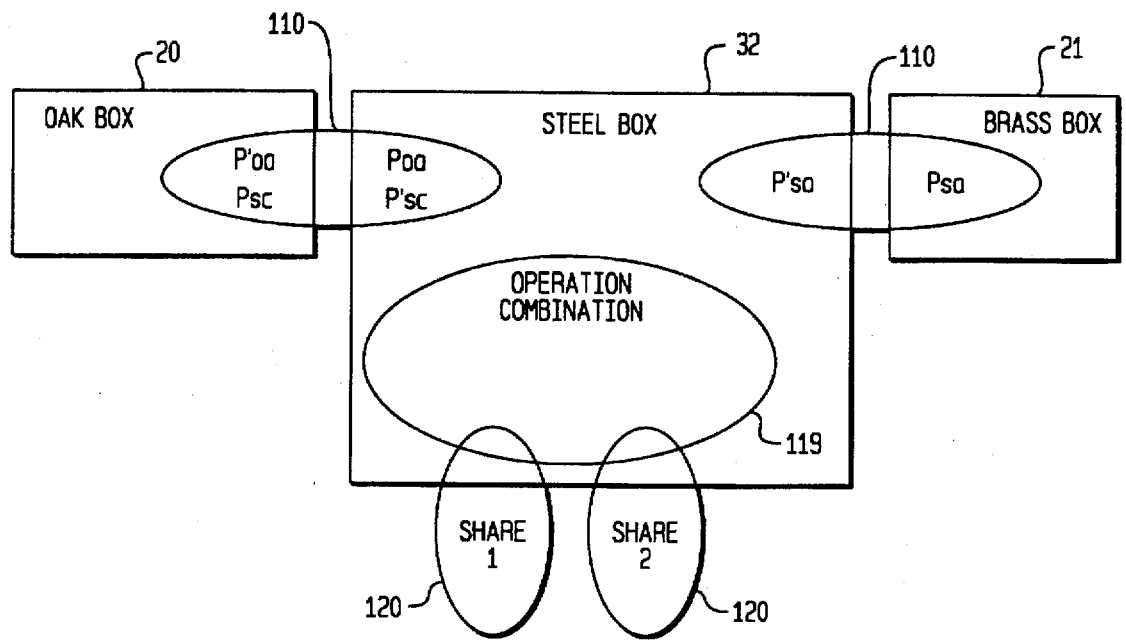
FIG. 11 is a block diagram of the key material for the steel box.

In the preferred embodiment, each Steel Box 32 in the vendor Manufacturing Facility requires an Operation Combination 119 that is broken into two Shamir secret shares 120 (FIG. 11). Individual shares 120 are written onto removable media and distributed to authorized personnel, for example to a supervisor and operator. The set of Supervisor and Operator shares 120 must be entered into Steel Box 32 before it can operate. The last entered share 106, for example the operator share, must remain in Steel Box 32 to keep it enabled. When operator share 120 is removed, Steel Box 32 is disabled.

Each Domain Steel Process 76 requires an RSA key pair for authentication. The private authentication key is only known by the Domain Steel Process 76. The public authentication key is only known by the Domain Brass Process 72. Each Domain Steel Process 76 requires an RSA key pair for confidentiality. The private confidentiality (P'sc) key is only known by the Domain Steel Process 76. The public confidentiality (Psc) key is known by the Domain Oak Process 70.

Figure 12:
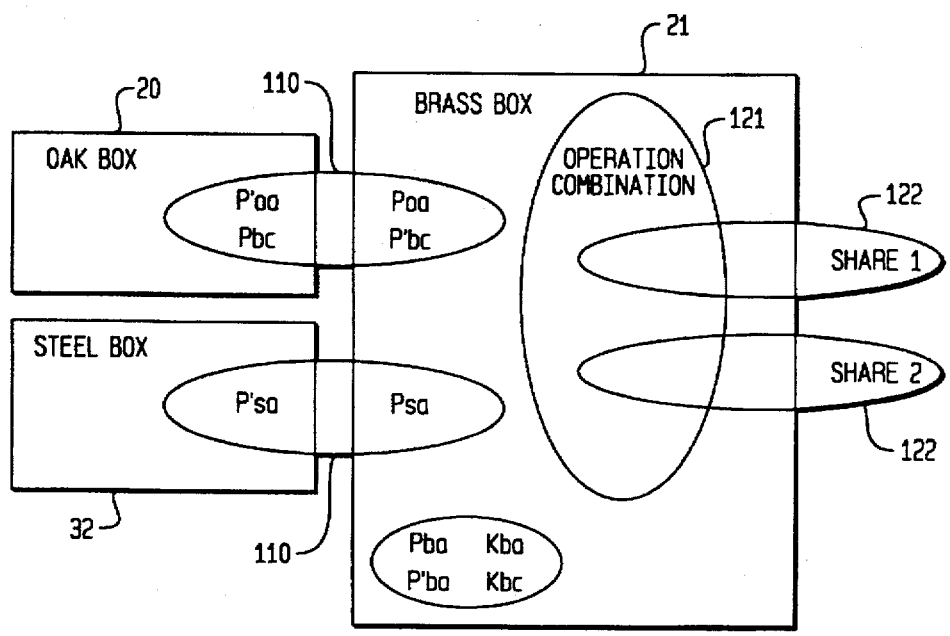
FIG. 12 is a block diagram of the key material for the brass box.

In the preferred embodiment of the present invention, each Brass Box 21 requires an Operation Combination 121 that is broken into two Shamir secret shares 122 (FIG. 12). Individual shares 122 are written onto removable media and distributed to authorized personnel. All shares 122 must be entered into a Brass Box 21 before it can operate. The last entered share 122 must remain in Brass Box 21 to keep it enabled. When the last entered share 122 is removed, Brass Box 21 is disabled.

Each Domain Brass Process 72 requires an RSA key pair for authentication. The private and public authentication keys (P'BA and PBA) are only known by the Domain Brass Process. Each Domain Brass Process requires an RSA key pair for confidentiality. The private confidentiality key ($P'_{BC}$) is only known by Domain Brass Process 72. The public confidentiality (PBC) key is known by the Domain Oak Process 70. Each Domain Brass Process 72 requires a DES key set for confidentiality that is only known by the Domain Brass Process 72. Each Domain Brass Process 72 requires a DES key set for authentication that is only known by the Domain Brass Process 72.

It will be understood by those skilled in the art that the number of shares selected as being necessary to operate the secure boxes is based on the security strategy implemented for the Key Management System.

Digital Meter Requirements

A manufacturing sequence number, in conjunction with a product code number, uniquely defines digital meter 36 within the vendor manufacturing process. The preferred method for the manufacturing sequence number allocation is as follows. A supply of identification labels, each containing a unique product code number and manufacturing sequence number pair, is stocked on the manufacturing line. One identification label is applied to each digital meter 36. These numbers are entered into the PSR Computer 34 and downloaded into digital meter 36 prior to the Key Installation process.

The meter is securely configured so that once keys are installed during manufacture, they can never be removed or determined outside the manufacturing environment without leaving physical evidence of tampering.

The Domain Oak Process 70 employs a set of test information during the Master Key Generation process. A Test Pattern is used to generate a set of test tokens to check the Master Key Installation process in Manufacturing. The Test Pattern consists of two preformatted 64 bit binary values. These are encrypted with the target Domain Master Key and the specified position and number of tokens from the resulting cyphertext is generated.

The Test Pattern is included in the Domain Oak and Domain Brass Processes operating software. All digital meters employ the same test information during the key installation check procedure. The test pattern is a set of information shared between Key Management System 10 and the target digital meter. The test pattern may be stored in ROM for a specific digital meter.

Earth Domain Digital Meters

Earth Domain digital meters do not have country specific information when they leave the Manufacturing Facility. This is done to allow digital meters to be stocked on a regional basis and be made country specific at the last moment. The product code number for an Earth Domain digital meter is a two letter product code prefix followed by a predetermined number. Prior to country personalization, an Indicia Serial Number will be a null string. Both Product Code Number and Indicia Serial Number values must be defined at Key Registration time to make the Domain Master Key active.

Figure 13:
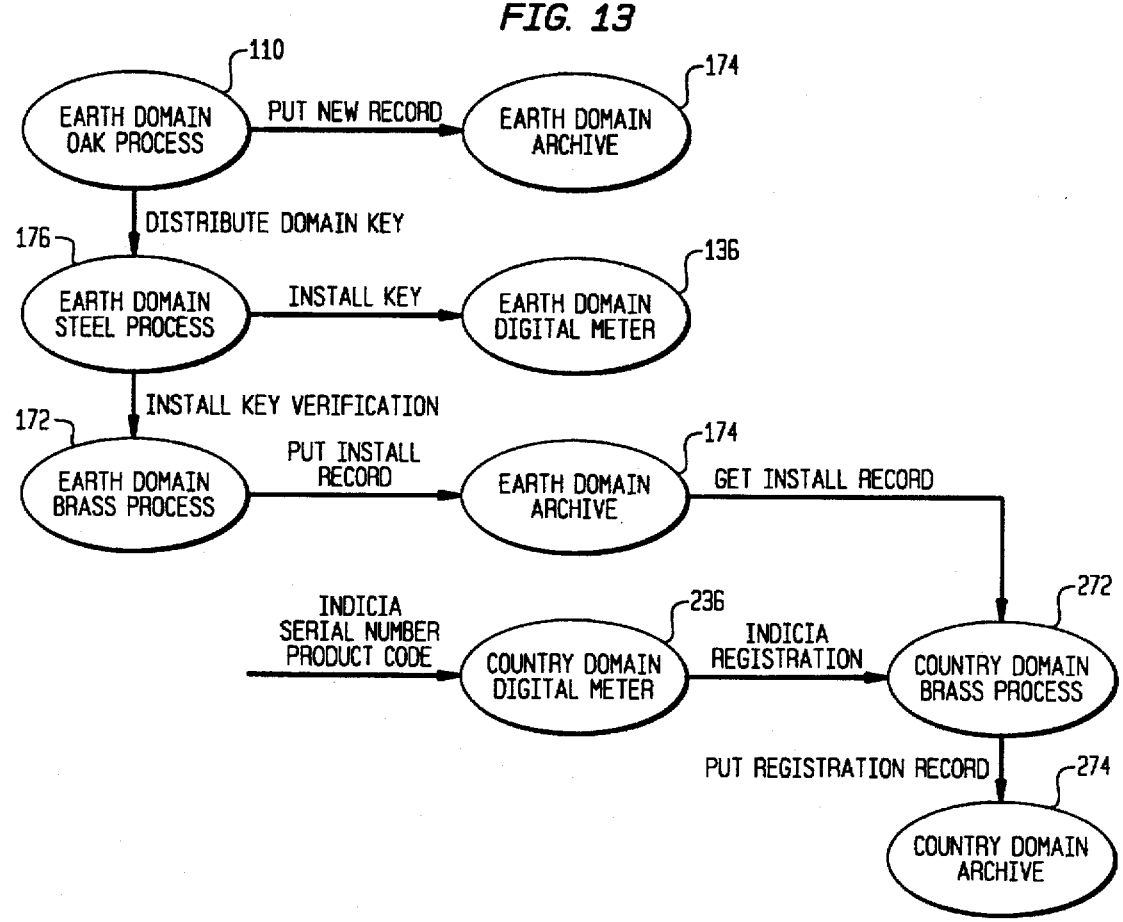
FIG. 13 is a flow diagram of an Earth domain digital meter process.

Referring now to FIG. 13, a process flow diagram for an earth domain digital meter is provided. Earth Domain master keys for Earth Domain digital meters are generated by the Earth Domain Oak Process 170. Copies of Earth Domain master keys are stored in the Earth Domain Archive 174. Earth Domain master keys are installed into Earth Domain digital meters 136 and checked by the Earth Domain Steel Process 176. Installation of Earth Domain master keys is verified by the Earth Domain Brass Process 172. The Earth Domain Master Key record is updated to install status by the Earth Domain Brass Process 172. The Earth Domain Brass Process 172 does not participate in Key Registration.

Authorized personnel assigns the Earth Domain digital meter 136 to a country specific security domain by setting the digital meter product code number and indicia serial number. Once the digital meter 236 has been assigned to a country specific security domain, it cannot return to the Earth Domain. A digitally signed Key Registration record is generated by the digital meter containing the Product Code Number, Indicia Serial Number and Manufacturing Sequence Number. The digitally signed Key Registration record is returned to Key Management System Computer 24.

Key Management System Computer 24 will retrieve the Earth Domain Master Key record from the Earth Domain Archive 176. The Earth Domain Master Key record and the Key Registration record is sent to the country specific Domain Brass Process 272. The records are verified. If no problems are found, the Domain Master Key is encrypted with the country specific secret key. The Domain Master Key record is signed for integrity and authentication by the country specific Security Domain private key. The Domain Master Key record will be sent to the country specific Domain Archive 274.

SYSTEM REQUIREMENTS

Domain Archive

Domain Archives 74 support the long term storage and retrieval of Domain master keys. This is accomplished with several transactions between the Oak Box 20, Domain Archive 74 and Brass Box 21. As the digital meter passes through manufacturing, distribution and customer sites, the Domain Master Key Status is updated. Every status change is logged to the Domain Archive records, providing a complete history of key activity for the life of the Domain Master Key.

Figure 14:
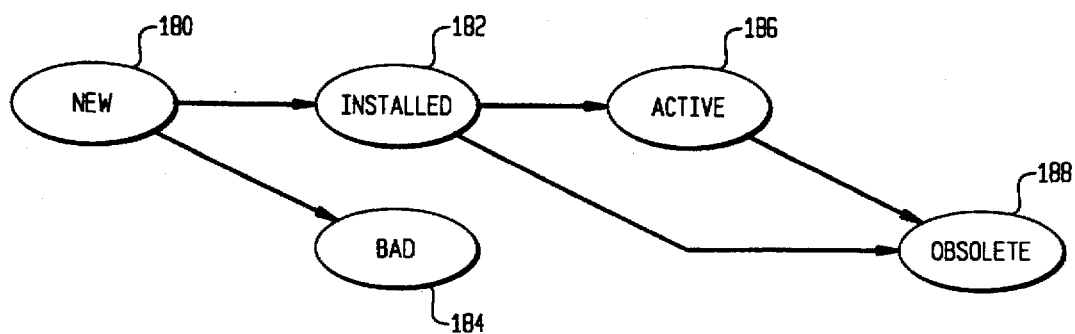
FIG. 14 is a flow diagram of valid master key status transitions.
Figure 15:
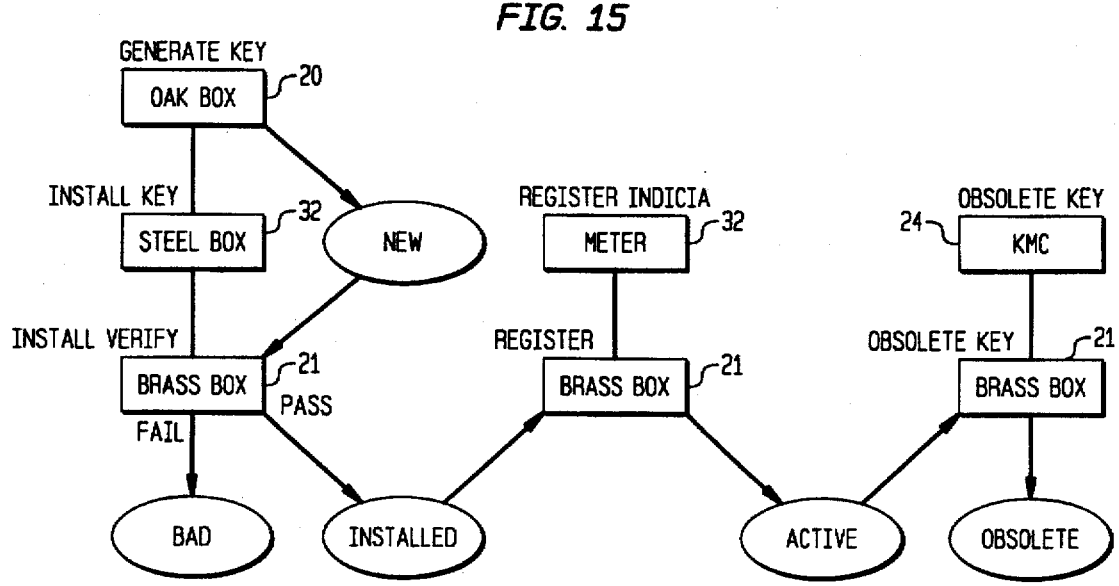
FIG. 15 is a block diagram of valid master key status transitions.

Referring now to FIGS. 14 and 15, a process flow diagram that shows valid master key status transitions is provided. After Oak Box 20 completes the key generation process, an encrypted copy of the Domain Master Key and information is forwarded to the Domain Archive 74. The status of the Domain Master Key will be set to New at 180. The Domain Archive 74 will allocate database storage and write the information.

After Steel Box 32 and Brass Box 21 complete the key installation process, the Domain Master Key record is updated. The status of the Domain Master Key may be set to Installed at 182, if the process was successful. The status of the Domain Master Key may be set to Bad at 184, if any failures occur during the key distribution or installation process. Such failures could include a lost message, message error, error writing the Domain Master Key to the digital meter memory, error in checking the test tokens or others.

When the digital meter is assigned an Indicia Serial Number for a specific postal domain, the Vendor and Postal Domain Master Key Records are updated. The Master Key status is set to Active at 186 and verification services are allowed for that digital meter. When the digital meter is taken out of service, the Vendor and Postal Domain Master Key record are updated. The Master Key status is set to Obsolete at 188.

Key Management System Addresses

Key Management System 10 is composed of a set of physical secure boxes and logical security domains. Messages flowing between these components must contain sufficient information to allow processes and auditors to identify the message participants.

Logical security domains are determined by an address object called Domain ID. This address uniquely defines an instance of a particular domain within Key Management System 10. Examples of valid Domain IDs may be VE for a vendor Security Domain, USPS for the instance of a United Stated Postal Service Security Domain and UKRM for the instance of a United Kingdom Royal Mail Security Domain. Security domains span several secure boxes and may span several archives. Multiple security domains may coexist within the physical boundaries of one secure box. Only one domain is active within a secure box at any given time. No data is transferable between domains.

Logical secure box objects are determined by an address object called Secure Box Type. This address uniquely defines the secure box function participating in a message transaction. The Oak Box 20 is the Master Key Generator.

The Steel Box 32 is the Master Key Installation Box. The Brass Box 21 is the Token Verification Box. The Tin Box 44 is the Remote Token Verification Box.

Identification of physical secure boxes is determined by an address object called Secure Box ID. This address uniquely defines an instance of that box within Key Management System 10. It is composed of a Secure Box Type and numeric identifier.

KMS Configuration Data

Each component of Key Management System 10 maintains several configuration tables that allow the operating software to determine the validity and processing requirements for Key Management System service messages. Command tables are used to identify what Key Management System service messages and commands are expected by components of the system. A KMS system command table defines all commands that are accepted on a system level. Subsets of the system level table are stored by components of the system, including the Oak Boxes 20, Brass Boxes 21, Steel Boxes 32, Manufacturing Boxes 23, KMS Computer 24, Key Distribution Computer 30 and PSR Computers 34. Received messages that are not included in the local command table are rejected.

Configuration tables are used to identify what Key Management System Domain IDs are recognized by components of the system. A KMS system configuration table defines all Domain IDs that are accepted on a system level. Subsets of the system level table are stored by components of the system, including the Oak Boxes 20, Brass Boxes 21, Steel Boxes 32, Manufacturing Boxes 23, KMS Computer 24, Key Distribution Computer 30 and PSR Computers 34. Received messages for Domain IDs that are not included in the local configuration table are rejected.

Record tables are used to identify what Key Management System Records are recognized by components of the system. A KMS system record table defines all information records that are recognized on a system level. Subsets of the system level table are stored by components of the system, including the Oak Boxes 20, Brass Boxes 21, Steel Boxes 32, Manufacturing Boxes 23, KMS Computer 24, Key Distribution Computer 30 and PSR Computers 34. Received messages containing information records that are not included in the local record table are rejected.

Information Flow

Figure 16:
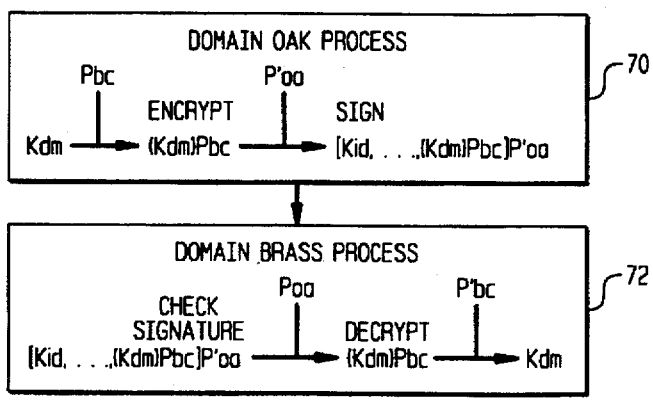
FIG. 16 is a message from oak box to brass box.

The Domain Oak Process 70 delivers the Domain Master Key to the Domain Archive 74. Referring now to FIG. 16, the Domain Master Key ($K_{DM}$) is encrypted with the Domain Brass Process public key ($P_{BC}$) before it is stored in the Domain Archive 74. Thus, the Domain Oak Process 70 may not decrypt the Domain Master Key ($K_{DM}$) from the Domain Archive 74. The Domain Oak Process 70 signs the Domain Master Key record with the Domain Oak Process private key ($P_{OA}$) before it is stored in the Domain Archive 74. Thus, the Domain Brass Process 72 can trust that the Domain Master Key record was created by the Domain Oak Process 70.

Figure 17:
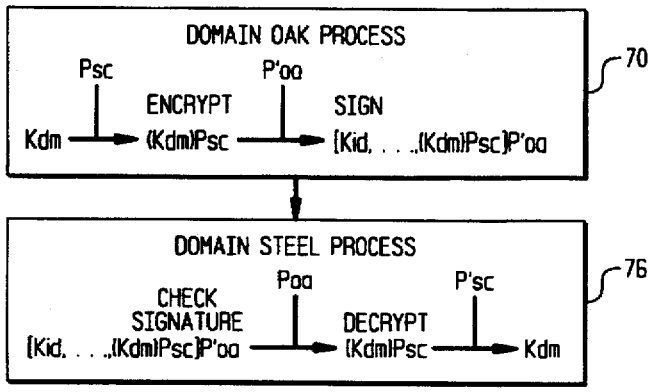
FIG. 17 is a message from oak box to steel box.

The Domain Oak Process 70 delivers the Domain Master Key ($K_{DM}$) to the Domain Steel Process 76. Referring now to FIG. 17, the Domain Master Key ($K_{DM}$) is encrypted with the Domain Steel Process public key $P_{(SC)}$ before it is sent to the Domain Steel Process 76. Thus, the Domain Oak Process 70 may not decrypt the Domain Master Key ($K_{DM}$) from a Distribute Master Key record. The Domain Oak Process 70 signs the Distribute Master Key record with the Domain Oak Process private key P'$_{(OA)}$ before it is sent to the Domain Steel Process 76. Thus, the Domain Steel Process 76 can trust that the Distribute Master Key record was created by the Domain Oak Process 70.

Figure 18:
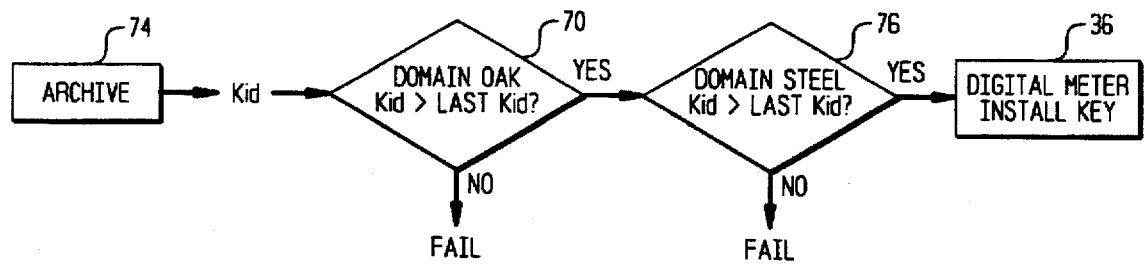
FIG. 18 is logic diagram for key freshness detection.

Referring now to FIG. 18, the process flow for key freshness detection is shown. To support the previously noted security requirements, a key is installed or attempted to be installed only once to assure Domain Master Key freshness. The Domain Archive assigns monotonically sequenced Key IDs (KID) to all Domain master keys. Separate Key ID indexes are maintained for each Domain ID. The Domain Oak Processes 70 and Domain Steel Processes 76 track the Key ID values and compare them to Key ID values received in the Generate Key message and Distribute Master Key record. Thus, the Domain Oak Processes 70 and Domain Steel Processes 76 can detect when a Generate Key message or Distribute Master Key record is replayed.

Figure 19:
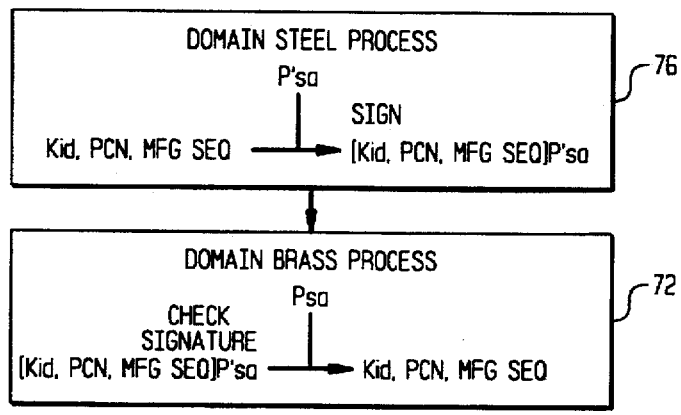
FIG. 19 is a message from steel box to brass box.

Referring now to FIG. 19, the Domain Steel Process 76 signs the Master Key Install record with Domain Steel Process private key P$_{(SA)}$ before it is sent to the KMS Computer 24. By doing so, the Domain Brass Process 72 can trust that the Master Key Install record was created by the Domain Steel Process 76.

Figure 20:
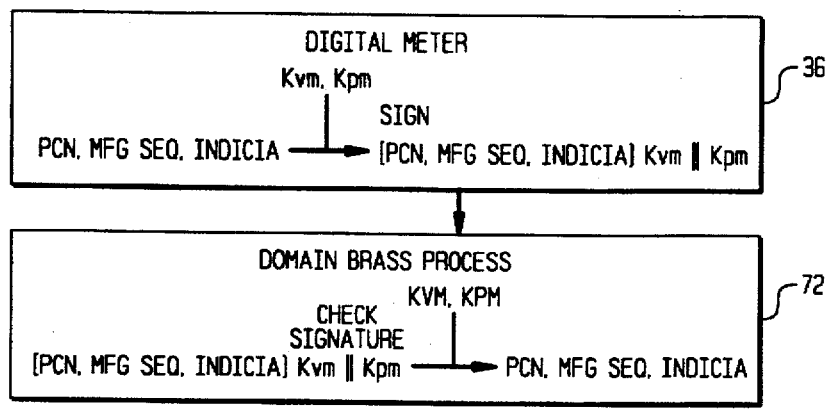
FIG. 20 is a message from a meter to brass box.

At time of Key Registration, the digital meter signs the Key Registration record with both the vendor Master Key K$_{(VM)}$ and the postal Master Key K$_{(PM)}$. Thus, the Postal and Vendor Domain Brass Processes 72 can trust that the Key Registration record values originated at digital meter 36. Each Domain Brass Process 72 then encrypts the Domain Master Key in the Domain Archive record with a Domain Brass Process secret DES key. As a result, Domain Brass Processes 72 can trust that other Domain Brass Processes may not read the keying material. The Domain Brass Process 72 signs the Domain Master Key record with the Domain Brass Process secret DES key before sending it to the Domain Archive 74. Thus, the Domain Brass Process 72 can trust that the Domain Master Key record was only modified by the Domain Brass Process 72. An example of a meter to Brass Process message is shown in FIG. 20.

Audit Trail

Key Management System 10 maintains an audit trail of time events in the life of a Domain Master Key. These events indicate when actions are taken by Key Management System 10. The time events listed must be increasing for successful Domain Master Key use. System messages with time events preceding previous events will be rejected. Verification requests received with dates preceding the Key Management System Key Registration time will be rejected.

In the preferred embodiment of the present invention, the KMS Computer 24 records the KMS Request Time which is when a Request Key command is received from the Key Distribution Computer 30. The PSR Computer 34 records the PSR Install Time which is when an Install Key command is delivered to a Steel Box 32. The KMS Computer 24 records the KMS Install Time which is when an Install Key Verification command is received from the Key Distribution Computer 30. The digital meter 36 records the Meter Registration Date which is when a Register Indicia command is received from the communications port or user interface. The KMS Computer 24 records the KMS Key Registration Time which is when a Register Indicia Verification command is received from the digital meter.

In an alternate embodiment, the Oak Box 20 records a local time when the Generate Key command is received from the KMS computer 24. The Steel Box 32 records a local time when the Install Key command is received. The Brass Box 21 records a local time when a Key Verification request is received from Key Management System computer 24.

Error Handling

Key Management System 10 provides a set of error detection and reporting mechanisms for Key Management System service messages. Problems may occur when messages are prepared, sent over communications lines, received or processed by the receiving party. When errors are detected in the system, the command source will be notified and an entry will be made in the system Error Log.

Figure 21:
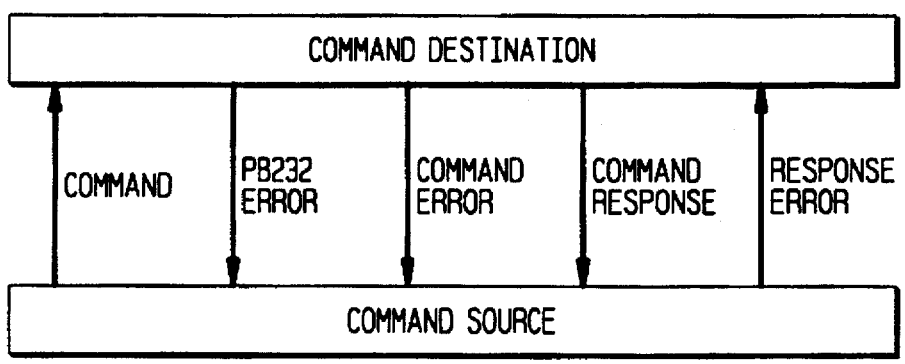
FIG. 21 is a block diagram of error handling.

Referring now to FIG. 21, a block diagram showing an overview of error handling is provided. Errors in the system are detected in three different levels. The first level of error handling is implemented within the PB232 protocol. This protocol provides for message framing through the use of STX and ETX control characters. Message identification is provided through the use of predefined Class Codes. Message integrity is provided through the use of error detection codes. If the received message complies with these mechanisms, the receiver will send a positive Acknowledgment control character. If not, the receiver will send a Non-Acknowledgment control character. The sending component may attempt to retry transmission of the message or take other corrective action. PB232 error handling mechanisms are of a conventional type.

The second level of error handling is implemented by Key Management System 10 command handler processes. These compare the received command with a set of expected commands as defined in a Command Table. The command field is verified. The number of expected parameters is checked. The syntax of individual parameters is checked. If any errors are found in the command, a Command Error message will be returned to the command source.

The third level of error handling is implemented by Key Management System 10 command handler processes. These compare the parameters in the command against a set of expected parameters as defined in a Configuration Table. Individual parameters are checked against the Configuration Table. The association of different parameters is checked against the Configuration Table. The availability of hardware resources and database records is checked. Signatures of message components and the validity of encrypted message components are checked. If any errors are found in the command or during command processing, a Command Response message will be returned with a Response Code. If any errors are found in the Response, a Command Response Error message will be returned with a Response Code.

Initialization Process

Figure 22:
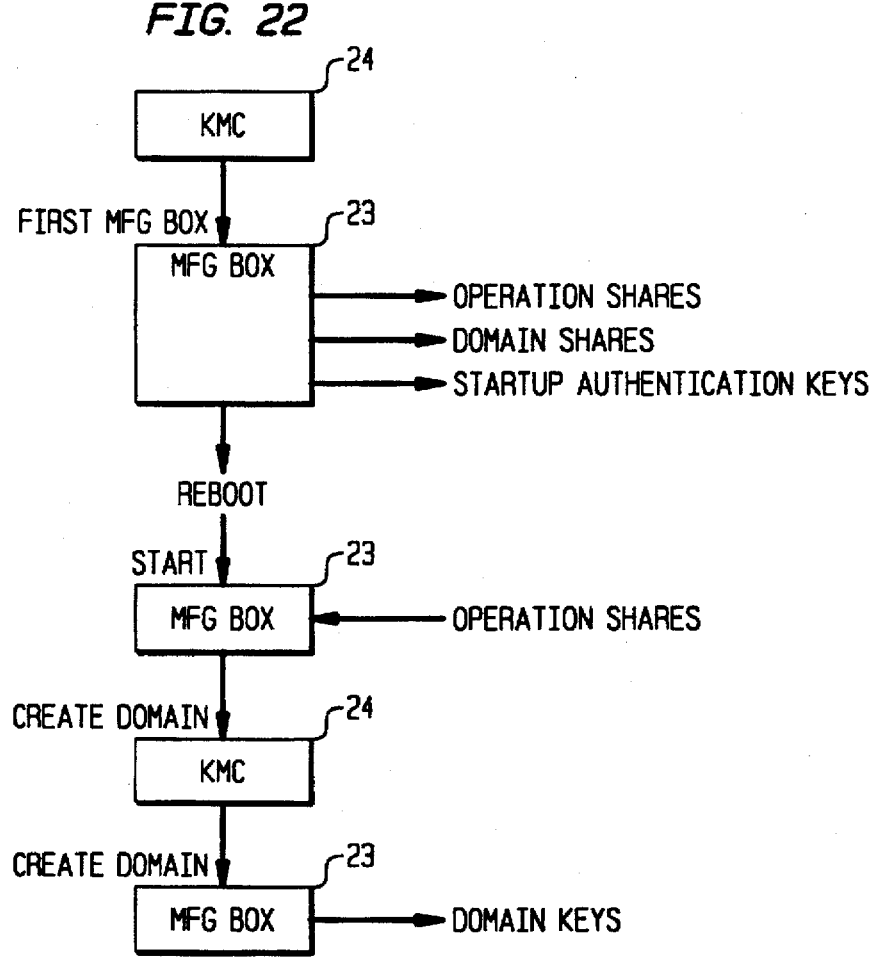
FIG. 22 is a flow diagram of an initialization of a first manufacturing box.
Figure 23:
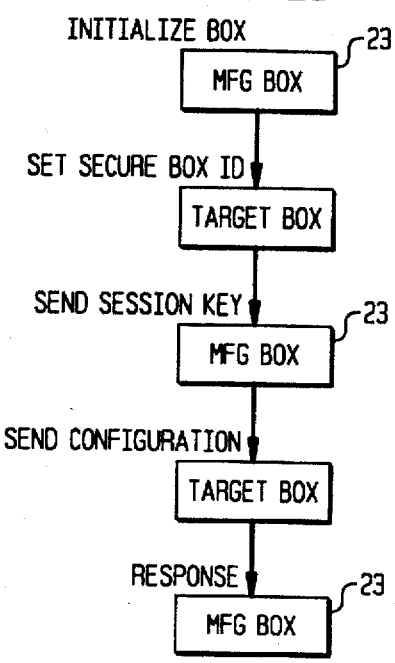
FIG. 23 is a flow diagram of an initialization of a generic box.

The following paragraphs provide an overview of Key Management System 10 Secure Box Initialization Process, as shown in FIGS. 22 and 23. As previously described, in the preferred embodiment of the present invention there are four Key Management System Secure Box types. Manufacturing Box 23 is responsible for Key Management System and Secure Box initialization. Oak Box 20 is responsible for Domain Master Key Generation. Steel Box 32 is responsible for Domain Master Key installation. Brass Box 21 is responsible for Domain Master Key Registration and Token Verification. In an alternate embodiment, Tin Box is a Remote Token Verification Box.

Referring now to FIG. 22, the First Manufacturing Box 23 must be initialized. The Manufacturing Box operating software is loaded and tested. The Secure Box ID is initialized to M00000000. When Manufacturing Box 23 is turned on, the Secure Box ID is queried. If it is set to M00000000, Manufacturing Box 23 waits for a Set First Secure Box ID message from the KMS Computer 24. KMS Computer 24 then commands the First Manufacturing Box 23 to set the Secure Box ID to M00000001. First Manufacturing Box 23 then receives and checks the message. If no errors are found, First Manufacturing Box 23 generates an Operation Combination 101 and set of Operation Share keys 102. The Operation Share keys 102 are written to removable media.

Next, First Manufacturing Box 23 generates two RSA key pairs, one for Domain Key Set Confidentiality and the other for Domain Key Set Authentication. These keys are broken into Domain Shares and written onto removable media. The keys are used to encrypt and sign Domain Key sets before they are sent to the KMS Computer 24 and written to the Archive or to removable media. First Manufacturing Box 23 generates a set of Secure Box Authentication keys. An RSA key pair is generated for each box type, i.e., Manufacturing, Oak, Steel and Brass. The public key for each box type is written to removable media. The keys must then be written into Secure Box Operating Software by Software Engineering. After all the Operation Shares and authentication keys have been successfully written, the Secure Box ID will be set to M00000001.

KMS Computer 24 requests Manufacturing Box 23 to create a Domain. Manufacturing Box 23 establishes the Domain ID in internal memory and generates the required Domain Keys 110 which are encrypted with the Domain Key Set 103 Confidentiality key and signed with the Domain Key Set 103 Authentication Key. The encrypted and signed Domain Keys are written to the Archive and/or to removable media.

Additional Manufacturing Boxes 23 are initialized by a Source Manufacturing Box, which is any manufacturing box that has been initialized. The Manufacturing Box operating software is loaded and tested in each additional Manufacturing Box 23. The Secure Box ID is set to M00000000. When Manufacturing Box 23 is first turned on, it queries the Secure Box ID. If it is M00000000, Manufacturing Box 23 waits for a Set Secure Box ID message from the Source Manufacturing Box. KMS Computer 24 commands the Source Manufacturing Box to initialize each additional Manufacturing Box 23. The Source Manufacturing Box allocates the next Manufacturing Secure Box ID, signs the message with the Manufacturing Box Private Startup Authentication Key and sends it to Manufacturing Box 23. Manufacturing Box 23 stores the Secure Box ID and generates a Manufacturing Box Startup Confidentiality Key. The Secure Box ID and Public Startup Confidentiality Key are sent back to the Source Manufacturing Box and signed with the Manufacturing Box Private Startup Authentication Key. KMS Computer 24 commands the Source Manufacturing Box to make a Domain Manufacturing Process for the Manufacturing Box. The required Domain Key components are delivered to Manufacturing Box 23 using the Startup Confidentiality Key. This process is repeated for all required Domains.

Any time domains are added to a Manufacturing Box 23, other initialized Manufacturing Boxes must be updated to reflect such additional domains. In the preferred embodiment, all initialized Manufacturing Boxes are configured with identical key data.

For Oak Box initialization, the Oak Box operating software is loaded and tested. The Secure Box ID is set to O00000000. When Oak Box 20 is first turned on, it queries the Secure Box ID. If it is O00000000, Oak Box 20 waits for a Set Secure Box ID message from Manufacturing Box 23. KMS Computer 24 commands Manufacturing Box 23 to initialize Oak Box 20. Manufacturing Box 23 allocates the next Oak Secure Box ID, signs the message with the Private Oak Box Startup Authentication Key and sends it to Oak Box 20, which stores the Secure Box ID and generates an Oak Box Startup Confidentiality Key. The Secure Box ID and Public Startup Confidentiality Key are sent back to the Manufacturing Box, signed with the Oak Box Public Startup Authentication Key. KMS Computer 24 commands Manufacturing Box 23 to make a Domain Oak Process for Oak Box 20. The required Domain Key components are delivered to Oak Box 20 using the Startup Confidentiality Key. This process enables Oak Box 20 to implement the Domain Oak Process 70 for one domain. This process is repeated for all domains required for a particular Oak Box.

For Steel Box initialization, the Steel Box operating software is loaded and tested. The Secure Box ID is set to S00000000. When Steel Box 32 is first turned on, it queries the Secure Box ID. If it is S00000000, Steel Box 32 waits for a Set Secure Box ID message from Manufacturing Box 23. KMS Computer 24 commands Manufacturing Box 23 to initialize Steel Box 32. Manufacturing Box 23 allocates the next Steel Secure Box ID, signs the message with the Steel Box Private Startup Authentication Key and sends it to Steel Box 32. Steel Box 32 stores the Secure Box ID and generates a Steel Box Startup Confidentiality Key. The Secure Box ID and Public Startup Confidentiality Key are sent back to Manufacturing Box 23, signed with the Steel Box public Startup Authentication Key. KMS Computer 24 commands Manufacturing Box 23 to make a Domain Steel Process 76 for Steel Box 32. The required Domain Key components are delivered to Steel Box 32 using the Startup Confidentiality Key. This process enables Steel Box 32 to implement the Domain Steel Process 76 for one domain. This process is repeated for all domains required for a particular Steel Box.

For Brass Box initialization, the Brass Box operating software is loaded and tested. The Secure Box ID is set to B00000000. When Brass Box 21 is first turned on, it queries the Secure Box ID. If it is B00000000, Brass Box 21 waits for a Set Secure Box ID message from Manufacturing Box 23. KMS Computer 24 commands Manufacturing Box 23 to initialize Brass Box 21. Manufacturing Box 23 allocates the next Brass Secure Box ID, signs the message with the Brass Box Private Startup Authentication Key and sends it to Brass Box 21. Brass Box 21 stores the Secure Box ID and generate a Brass Box Startup Confidentiality Key. The Secure Box ID and Public Startup Confidentiality Key are sent back to Manufacturing Box 23, signed with the Brass Box Public Startup Authentication Key. KMS Computer 24 commands Manufacturing Box 23 to make a Domain Brass Process for Brass Box 21. The required Domain Key components are delivered to Brass Box 21 using the Startup Confidentiality Key. This process enables Brass Box 21 to implement the Domain Brass Process for one domain. This process is repeated for all domains required for a particular Brass Box.

Generation, Installation and Registration Process

Referring now to FIGS. 24–27, an overview of Key Management System 10 Domain Master Key Installation Process is shown. No distinctions exist between the vendor and any postal Domain. Each operates in a similar independent manner. To successfully install a full set of Domain master keys to the digital meter 36, the set of operations are run for the vendor Domain and another set of operations are run for the selected postal Domain.

Figure 24:
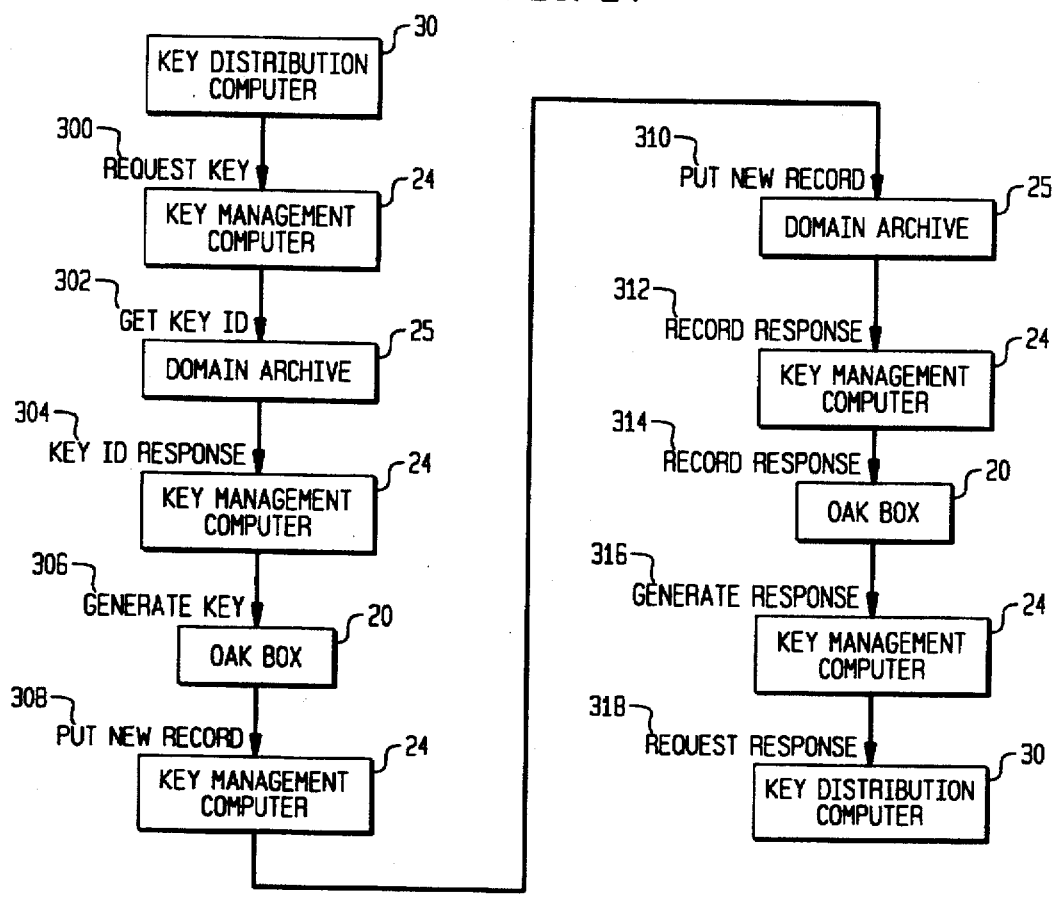
FIG. 24 is a flow diagram of the processing of a key request.
Figure 29:
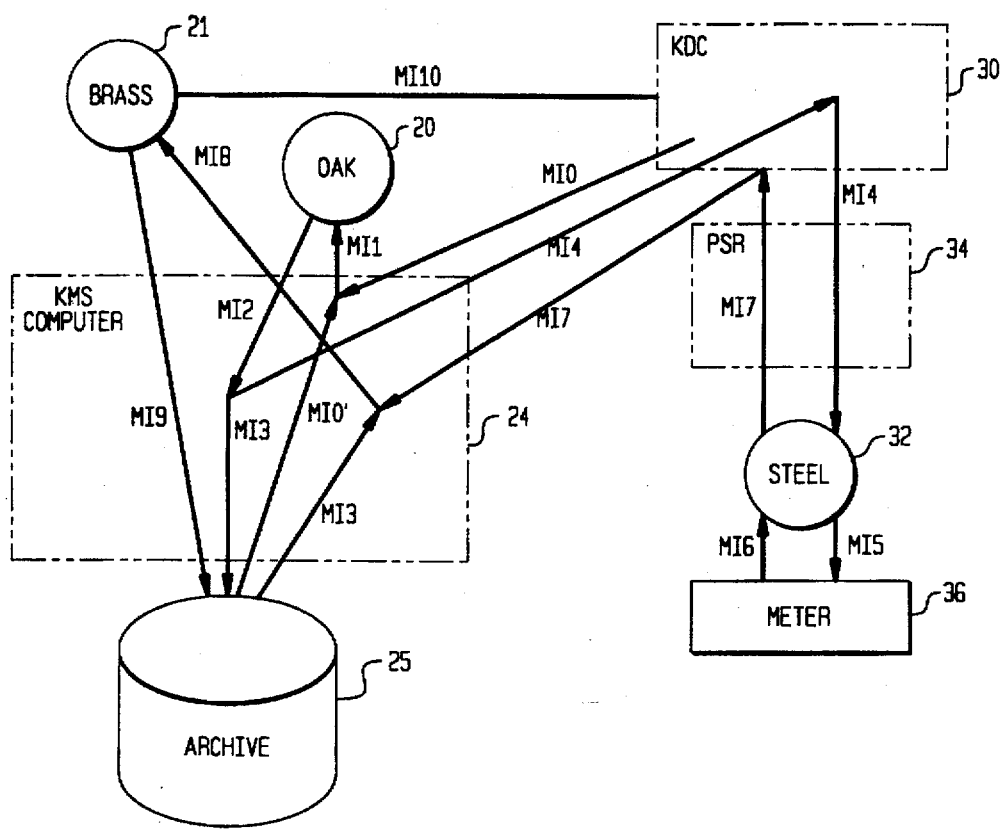
FIG. 29 is a block diagram showing the flow of key installation messages.

Referring now to FIGS. 24, 29 and 30, Domain Master Key Requests come from the Key Distribution Computer 30 during the manufacturing process manufacturing. At 300, the requests are sent with an identification number of Steel Box 32 from Key Distribution Computer 30 to KMS Computer 24 in message MI0. KMS Computer 24 requests Key ID at 302 from Domain Archive 74 which then generates a unique Key ID for the Domain. At 304 Domain Archive 74 sends a Key ID Response to KMS Computer 24 in message MI0'. KMS Computer 24 records a local time for an audit trail and, at 306, sends information in a Generate Key message MI1 to Oak Box 20. Oak Box 20 checks the request to determine the validity of the Domain, the validity of the Steel Box ID for the Domain and if the Key ID is higher than the last one processed for this Domain. If any of the checks prove false, Oak Box 20 returns a fail message to KMS Computer 24. If the checks are true, Oak Box 24 generates a Domain Master Key and set of Test tokens. At 308, Oak Box 20 delivers a Domain Master Key Record to KMS Computer 24 in message MI2. At 310 KMS Computer 24 forwards the Domain Master Key Record to Domain Archive 74 in message MI3. Domain Archive 74 stores the Domain Master Key Record in the database and a response is sent to KMS Computer 24 at 312. At 314, KMS Computer 24 forwards the response to Oak Box 20 which sends a Generate Response message to KMS Computer 24 at 316. At 318, KMS Computer 24 sends the Install Key Record to Key Distribution Computer 30 in a Request Response message MI4.

Figure 25:
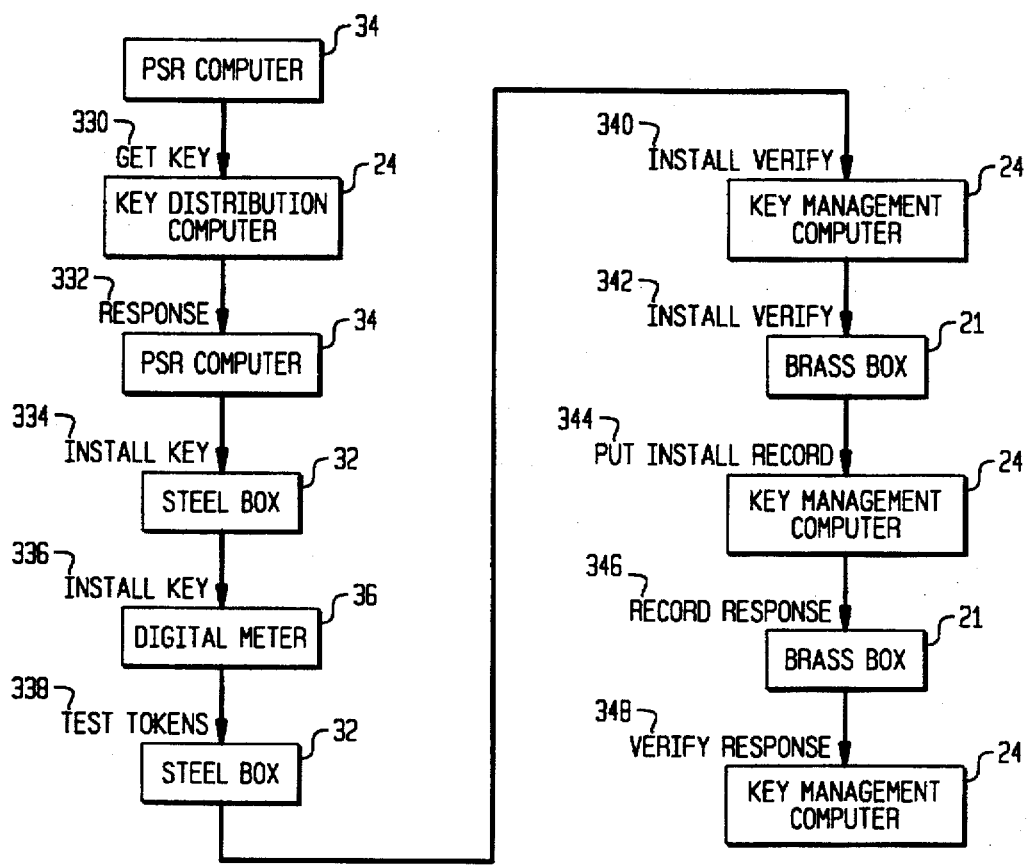
FIG. 25 is a flow diagram of the processing of a key installation.

Referring now to FIG. 25, when a digital meter 36 is presented on the Manufacturing Line, the PSR computer 34 requests an install domain key record from the key distribution computer 30 at 330. At 330, Key Distribution Computer 30 sends an install domain key record to the PSR Computer in message MI4' which is further sent to Steel Box 32 at 334. Steel Box 32 queries the digital meter 36 for information, then at 336 sends the Domain Master Key in message MI5 to digital meter 36. The digital meter installs and checks the key and return status to Steel Box 32 which queries the digital meter for a set of Meter Test tokens. At 338, the Meter Test tokens are returned in message MI6 to the Steel Box 32, which checks the Meter Test tokens against those received from Oak Box 20. Thus, Steel Box 32 checks that the Domain Master Key generated by Oak Box 24 is the same as the key installed in the digital meter 36. At 340, Steel box 32 forwards the installation status and information in message MI7 to the Key Management Computer 24 through the PSR computer and Key Distribution Computer 30. Key Management Computer 24 retrieves a domain master key record from the domain archive, takes a local time stamp and at 342 forwards information to Brass box 21 in message MI8. Brass Box 21 generates test tokens from the Domain Master Key record from the Domain Archive 74. These are compared with the Meter Test tokens. This checks that the Domain Master Key in the Domain Archive is the same as the key installed in the digital meter. If they check out, the Domain Master Key record is updated and forwarded in message MI9 to the Key Management Computer 24 at 344. The Key Management Computer 24 forwards in message MI9 the Domain Master Key Record to Domain Archive 74 and if successful returns a response to the Brass Box 21 at 346. Brass Box 21 checks response and returns a success or failure verification to KMS Computer 24 at 348 and to Key Distribution Computer 30 in message MI10.

Key registration consists of associating the country of registration, and the indicia number with the product code number and the key. The key is then stored in the country sub-domain of the install domain using a secret key that is specific to the country sub-domain. The essential feature is that the brass process that is specific to that country sub-domain relies on the install domain to install keys securely and with integrity. Keys never transfer from one install domain to another.

Figure 26:
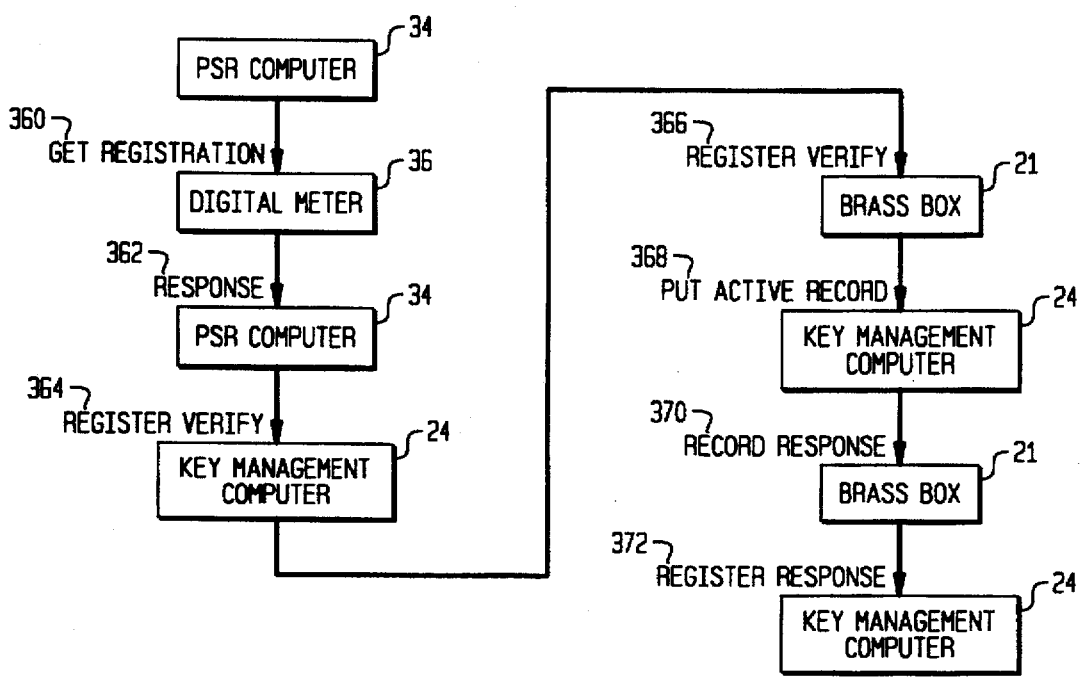
FIG. 26 is a flow diagram of the processing of a key registration.

Referring now to FIGS. 26 and 31, when the digital meter is prepared for a specific Security Domain, the Indicia Serial Number and/or Product Code Number is entered into the digital meter in message MR1. The PSR computer 34 requests registration tokens from digital meter 36 at 360. The digital meter generates two digital tokens and returns them the PSR computer at 362. The PSR computer combines the tokens with other meter information and forwards the resulting record to the Key Management Computer 24 through the Key Distribution Computer 30 at 364. At 366 Key Management System Computer 24 retrieves a domain master key record from the domain archive, takes a local time stamp and forwards information to Brass Box 21 in message MR2. Brass Box 21 generates registration tokens from the Domain Master Key record from the Domain Archive 74. These are compared with the Meter Registration tokens. This checks that the Indicia Serial Number, Product Code Number and Manufacturing Sequence Number were correctly reported by the Digital Meter. If they check out, the Domain Master Key record is updated and forwarded to the KMS Computer 24 at 368. Key Management System Computer 24 forwards the domain master key record to Domain Archive 74 in message MR3 and if successful returns a response to the Brass Box 21 at 370. Brass Box 21 checks response and returns a success or failure verification in message MR4 to Key Management System Computer 24 at 372.

Figure 32:
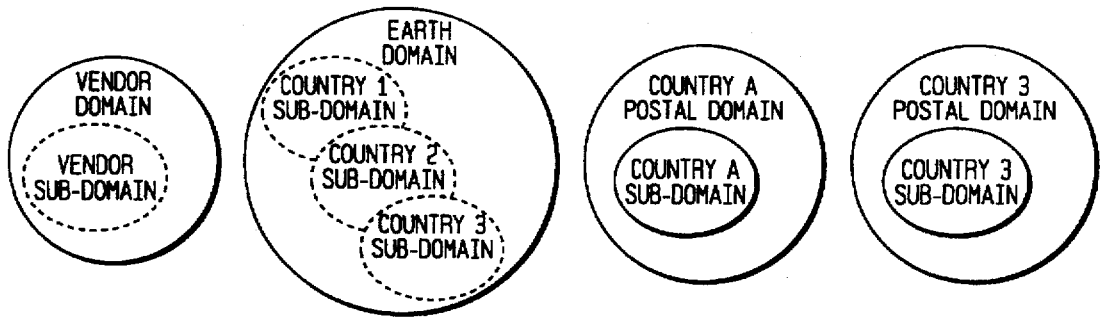
FIG. 32 is a block diagram showing the relationship of domains and sub-domains.

Every domain has at least one sub-domain that is responsible for registering keys to indicia numbers and performing indicia verification within that sub-domain. The Earth domain in particular has several country sub-domains. It is possible for one country to have meters in a sub-domain of the Earth domain and meters in the unique sub-domain of its own postal domain. In the example shown in FIG. 32, Country 3 has both a unique postal domain and a postal sub-domain of the earth domain. However, Country A has only meters that have keys which are installed within that country's unique postal domain.

Figure 27:
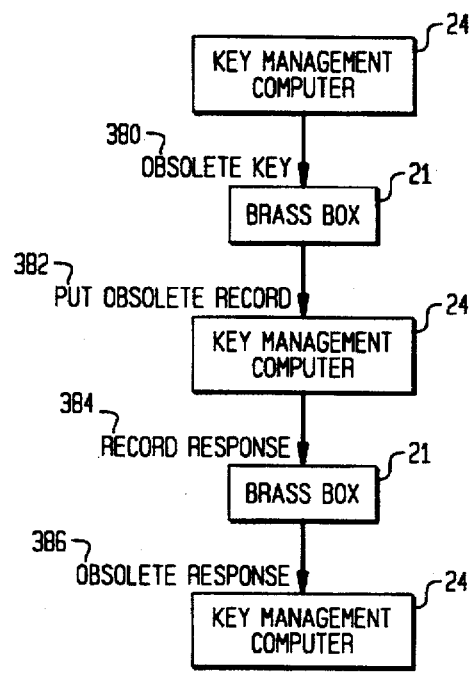
FIG. 27 is a flow diagram of the processing of an obsolete key.

Referring now to FIG. 27, if a digital meter is taken out of service, the information is recorded and sent to the KMS Computer 24. Key Management Computer 24 retrieves a domain master key record from the domain archive, takes a local time stamp an forwards information to Brass box 21 at 380. The Domain Master Key record is updated and forwarded to the Key Management Computer 24 at 382. The key management computer forwards the domain master key record to the domain archive and if successful returns a response to the Brass Box 21 at 384. Brass Box 21 checks response and returns a success or failure verification to Key Management Computer 24 at 386.

Generation of Tokens

Each meter uses the Domain Master Key to generate a temporal key, also referred to herein as a token key, for each domain, which is used to generate a token from mailpiece data. The Key Management System may distribute postal temporal keys to authorized postal verification sites having a Distributor Token Verification Box 44 (FIG. 1), also referred to herein as Tin Box. Postal temporal keys are used by Tin Box 44 for local verification of indicia. Under this arrangement, the Key Management System provides a higher level of security because the Post can obtain local verification of indicia without distributing the Master Key database at multiple sites.

Verification Process

The following paragraphs provide an overview of Key Management System 10 Verification Process. There are no distinctions between the vendor and any postal Domain. Each operates in a similar manner, independently. To successfully verify both tokens, the set of operations are run for the vendor Domain and another set of operations are run for the selected postal Domain.

Figure 28:
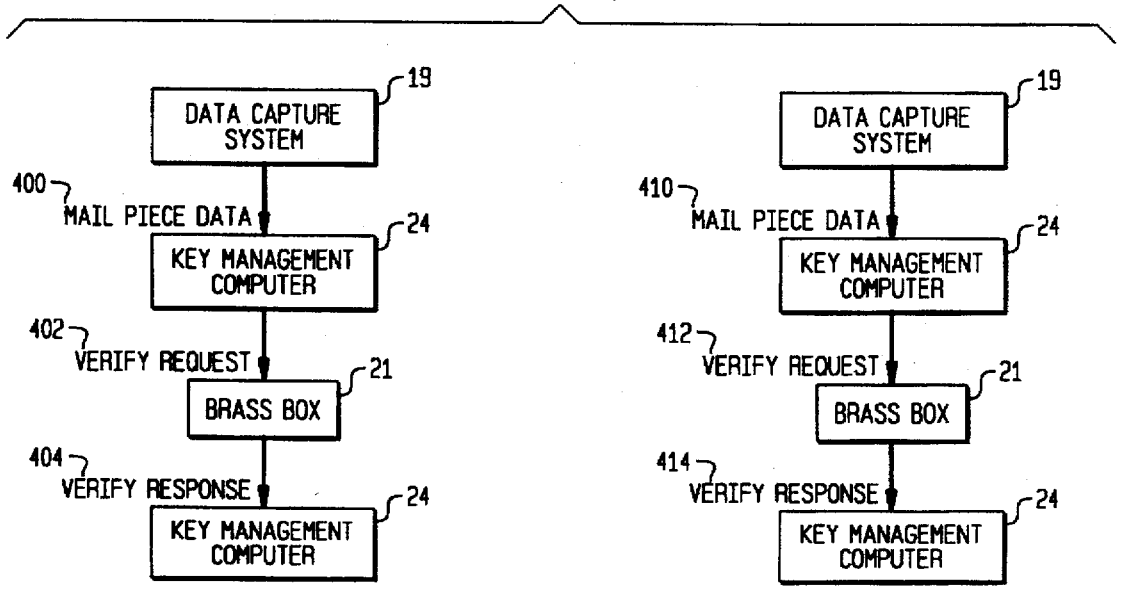
FIG. 28 is a flow diagram of verification processing.

Token Verification Requests come from a data capture system 19 located at Mail Facility 18. The request contains an ASCII text representation of information printed on a physical mail piece. Referring now to FIG. 28, at 400 the request is sent to a Key Management System Computer 24 located in the vendor or postal Data Centers. The Key Management System Computer 24 inspects the Mail Piece Data check digits and makes corrections if necessary. Key Management Computer 24 retrieves a domain master key record from the domain archive and forwards information to Brass box 21 at 402. Brass Box 21 checks the request and verifies that the Domain Master Key is Active. Brass Box 21 recalculates the selected domain's token using the Domain Master Key from the Domain Archive and the mail piece information. The calculated token is compared with the mail piece token to see if they match. A good/bad comparison result is sent to the KMS Computer 24 at 404. A second example is shown in FIG. 28 to highlight that an additional verification is required to verify the other domain token.

The foregoing description of the present invention is the preferred embodiment wherein the Post has authorized a Vendor to generate Postal Master Keys and install them into digital meters. The keys are then sent to Postal Data Center 16 to be used for postal token validation. The Key Management System includes the capability for different distribution of functionality, secure boxes and databases. For example, in one alternate embodiment, a Post authorizes the Vendor or another party to maintain and operate the Postal Data Center 16, including the functions of postal key generation, maintenance, token validation and communicating keys to vendors. In this embodiment, the Postal Brass Box 40 and the Postal Key Archive 42 are physically located at the site of the Vendor or other party. In another embodiment, the Post manages its Data Center and the Postal Oak Box 22 is physically located at the Postal Data Center 16.

In another alternate embodiment (not shown) any combination of the Key Management System functionality, i.e. domain oak process, domain steel process or domain brass process, could be integrated into any of the secure boxes.

Thus, it will be understood that the Key Management System has an inherent flexibility that allows different domains, i.e., Posts, to implement different physical implementations of the same logical Key Management System. The Key Management System provides such flexibility while maintaining a high level of system integrity and security. It will be further understood that the present invention allows multiple vendors to support multiple posts.

The present invention has been described for a preferred embodiment relating to digital postage meter evidencing. It will be understood by those skilled in the art that the present invention is also suitable for use as a Key Management System for transaction evidencing in general, such as for monetary transactions, item transactions and information transactions.

As used herein, the term "digital postage meter" refers to conventional types of digital postage meters that are coupled to secured printing means and other types of digital postage meters that are coupled to unsecured printing means or have other configuration differences from such conventional digital postage meters.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of configuring transaction evidencing devices comprising the steps of:

a) generating a master key in a logical security domain of a Key Management System;

b) installing the master key into a transaction evidencing device;

c) verifying the installation of the master key; and d) registering the master key to a logical security sub-domain in the Key Management System.

2. The method of claim 1 wherein said step of generating the master key further comprises the steps of:

generating a domain;

generating at least one sub-domain;

installing the domain in secure boxes of the Key Management System;

generating a master key and test token within the domain; and recording the master key in the domain archive.

3. The method of claim 1 wherein said step of installing the master key further comprises the steps of:

installing the master key into a transaction evidencing device; and associating the master key with a physical device identifier.

4. The method of claim 1 wherein said step of verifying the master key further comprises the steps of:

generating a token in the transaction evidencing device;

verifying that the test token and the transaction evidencing device generated token are identical;

generating a token from a master key in the archive; and verifying that the transaction evidencing device generated token and the archive generated token are identical.

5. The method of claim 1 wherein said step of registering the master key to a logical security sub-domain in the Key Management System further comprises the steps of:

assigning a sub-domain to the transaction evidencing device;

installing a logical device identifier into the transaction evidencing device;

associating the logical device identifier to the physical device identifier;

generating a registration token in the transaction evidencing device based on the logical device identifier and the physical device identifier;

generating registration tokens using the master key recorded in the archives;

verifying that the registration tokens are identical; and recording the master key in the sub-domain.

6. The method of claim 1, further comprising the step of repeating steps a through d for each domain assigned to the transaction evidencing device.

7. The method of claim 1 wherein the transaction evidencing device is a digital postage meter.

8. A method of configuring transaction evidencing device in a Key Management System, comprising the steps of:
generating a domain;
generating at least one sub-domain;
installing the domain in secure boxes of the Key Management System;
generating a master key and test token within the domain;
recording the master key in the domain archive;
installing the master key into a transaction evidencing device and associating the master key with a physical device identifier;
generating a token in the transaction evidencing device;
verifying that the test token and the transaction evidencing device generated token are identical;
generating a token from a master key in the archive;
verifying that the transaction evidencing device generated token and the archive generated token are identical;
assigning a sub-domain to the transaction evidencing device;
installing a logical device identifier into the transaction evidencing device;
associating the logical device identifier to the physical device identifier;
generating a registration token in the transaction evidencing device based on the logical device identifier and the physical device identifier;
generating registration tokens using the master key recorded in the archives;
verifying that the registration tokens are identical; and
registering the master key in the sub-domain.

9. The method of claim 8 wherein the transaction evidencing device is a digital postage meter.

10. A method of configuring digital postage meters comprising the steps of:
a) generating a master key in a logical security domain of a Key Management System;
b) installing the master key into a digital postage meter;
c) verifying the installation of the master key; and
d) registering the master key to a logical security sub-domain in the Key Management System.

11. The method of claim 10 wherein said step of generating the master key further comprises the steps of:
generating a domain;
generating at least one sub-domain;
installing the domain in secure boxes of the Key Management System;
generating a master key and test token within the domain; and
recording the master key in the domain archive.

12. The method of claim 10 wherein said step of installing the master key further comprises the steps of:
installing the master key into a digital meter; and
associating the master key with a unique device identifier.

13. The method of claim 10 wherein said step of verifying the master key further comprises the steps of:
generating a token in the digital meter;
verifying that the test token and the meter generated token are identical;
generating a token from a master key in the archive; and
verifying that the meter generated token and the archive generated token are identical.

14. The method of claim 10 wherein said step of registering the master key to a logical security sub-domain in the Key Management System further comprises the steps of:
assigning a sub-domain to the digital meter;
installing a postal identifier into the digital meter;
associating the postal identifier to the unique device identifier;
generating a registration token in the digital meter based on the postal identifier and the unique device identifier;
generating registration tokens using the master key recorded in the archives;
verifying that the registration tokens are identical; and
recording the master key in the sub-domain.

15. The method of claim 10, further comprising the step of
repeating steps a through d for each domain assigned to the digital postage meter.

* * * * *